United States Patent
Voice et al.

(10) Patent No.: US 9,519,770 B2
(45) Date of Patent: Dec. 13, 2016

(54) TRANSACTION CARD FOR PROVIDING ELECTRONIC MESSAGE AUTHENTICATION

(75) Inventors: Christopher Brian Voice, Ottawa (CA); Michael Chiviendacz, Ottawa (CA); Edward Pillman, Dallas, TX (US)

(73) Assignee: Entrust, Inc., Dallas, TX (US)

( * ) Notice: Subject to any disclaimer, the term of this patent is extended or adjusted under 35 U.S.C. 154(b) by 345 days.

(21) Appl. No.: 13/242,729

(22) Filed: Sep. 23, 2011

(65) Prior Publication Data
US 2012/0006899 A1    Jan. 12, 2012

Related U.S. Application Data

(60) Division of application No. 10/849,402, filed on May 19, 2004, now Pat. No. 8,060,915, which is a continuation-in-part of application No. 10/748,523, filed on Dec. 30, 2003.

(51) Int. Cl.
| | | |
|---|---|---|
| G06K 19/00 | (2006.01) | |
| G06F 21/34 | (2013.01) | |
| H04L 12/58 | (2006.01) | |
| H04L 29/06 | (2006.01) | |
| H04L 9/32 | (2006.01) | |

(52) U.S. Cl.
CPC ............ G06F 21/34 (2013.01); H04L 9/3226 (2013.01); H04L 9/3271 (2013.01); H04L 12/58 (2013.01); H04L 63/08 (2013.01); H04L 63/083 (2013.01); H04L 63/104 (2013.01); H04L 63/126 (2013.01); H04L 63/1483 (2013.01)

(58) Field of Classification Search
USPC .................................. 235/487, 492
See application file for complete search history.

(56) References Cited

U.S. PATENT DOCUMENTS

| | | | |
|---|---|---|---|
| 3,719,801 A | 3/1973 | Drexler | |
| 3,827,726 A | 8/1974 | McVoy et al. | |
| 4,085,313 A * | 4/1978 | Van Ness | ....................... 235/381 |
| 4,184,148 A | 1/1980 | Smagala-Romanoff | |
| 4,189,353 A | 2/1980 | Harriman | |
| 4,445,712 A | 5/1984 | Smagala-Romanoff | |
| 4,795,890 A | 1/1989 | Goldman | |
| 4,921,278 A | 5/1990 | Shiang et al. | |
| 4,936,778 A | 6/1990 | Setchell et al. | |

(Continued)

FOREIGN PATENT DOCUMENTS

| | | |
|---|---|---|
| CA | 2193819 C | 1/1996 |
| EP | 1176489 A1 | 1/2002 |

(Continued)

OTHER PUBLICATIONS

Chinese Office Action; Chinese Application No. 200510121789.7; dated Nov. 25, 2011.

(Continued)

Primary Examiner — Matthew Mikels
(74) Attorney, Agent, or Firm — Faegre Baker Daniels LLP

(57) ABSTRACT

A transaction card comprising, such as a credit card or debit card, includes transaction card serial number information that identifies the transaction card, sender authentication information identifiable by location information and location information is on the transaction card. In addition, account information is also on the transaction card.

5 Claims, 18 Drawing Sheets

(56) References Cited

U.S. PATENT DOCUMENTS

| | | | |
|---|---|---|---|
| 5,233,436 | A | 8/1993 | Oksman et al. |
| 5,246,375 | A | 9/1993 | Goede |
| 5,251,259 | A | 10/1993 | Mosley |
| 5,347,580 | A | 9/1994 | Molva et al. |
| 5,367,150 | A * | 11/1994 | Kitta et al. ............. 235/380 |
| 5,381,539 | A | 1/1995 | Yanai et al. |
| 5,491,752 | A | 2/1996 | Kaufman et al. |
| 5,537,571 | A | 7/1996 | Deville |
| 5,552,845 | A | 9/1996 | Nagao et al. |
| 5,710,421 | A * | 1/1998 | Kokubu ................. 235/492 |
| 5,712,627 | A | 1/1998 | Watts |
| 5,839,058 | A * | 11/1998 | Phillips et al. ......... 455/575.1 |
| 6,230,169 | B1 | 5/2001 | Nagae |
| 6,246,769 | B1 | 6/2001 | Kohut |
| 6,438,550 | B1 | 8/2002 | Doyle et al. |
| 6,732,277 | B1 | 5/2004 | Vandergeest et al. |
| 6,772,336 | B1 | 8/2004 | Dixon, Jr. |
| 6,784,905 | B2 | 8/2004 | Brown et al. |
| 6,934,838 | B1 | 8/2005 | Boyce et al. |
| 6,950,949 | B1 | 9/2005 | Gilchrist |
| 6,970,827 | B2 | 11/2005 | Zeltzer et al. |
| 6,975,727 | B1 | 12/2005 | Vandergeest |
| 6,980,081 | B2 | 12/2005 | Anderson |
| 7,100,049 | B2 | 8/2006 | Gasparini et al. |
| 2002/0010684 | A1 | 1/2002 | Moskowitz |
| 2002/0066042 | A1* | 5/2002 | Matsumoto et al. ...... 713/202 |
| 2002/0078350 | A1 | 6/2002 | Sandhu et al. |
| 2002/0081179 | A1 | 6/2002 | Vallstrom |
| 2002/0091938 | A1 | 7/2002 | Hiltunen et al. |
| 2003/0009670 | A1 | 1/2003 | Rhoads |
| 2003/0015866 | A1 | 1/2003 | Cioffi et al. |
| 2003/0028786 | A1 | 2/2003 | Mustafa |
| 2003/0141373 | A1* | 7/2003 | Lasch et al. .............. 235/487 |
| 2003/0154406 | A1 | 8/2003 | Honarvar et al. |
| 2003/0204743 | A1 | 10/2003 | Devadas et al. |
| 2003/0210127 | A1 | 11/2003 | Anderson et al. |
| 2003/0233546 | A1 | 12/2003 | Blom |
| 2004/0054863 | A1 | 3/2004 | Harada et al. |
| 2004/0078571 | A1 | 4/2004 | Haverinen |
| 2004/0093372 | A1 | 5/2004 | Chen et al. |
| 2004/0122960 | A1 | 6/2004 | Hall et al. |
| 2004/0187018 | A1 | 9/2004 | Owen et al. |
| 2004/0190718 | A1 | 9/2004 | Dacosta |
| 2004/0193910 | A1 | 9/2004 | Moles |
| 2004/0223619 | A1 | 11/2004 | Jablon |
| 2005/0033688 | A1 | 2/2005 | Peart et al. |
| 2005/0050328 | A1 | 3/2005 | Mizrah |
| 2005/0050330 | A1 | 3/2005 | Agam et al. |
| 2005/0097320 | A1 | 5/2005 | Golan et al. |
| 2005/0144449 | A1 | 6/2005 | Voice |
| 2005/0144451 | A1 | 6/2005 | Voice et al. |
| 2005/0149761 | A1 | 7/2005 | Chiviendacz et al. |
| 2005/0177716 | A1 | 8/2005 | Ginter et al. |
| 2006/0015725 | A1 | 1/2006 | Smith et al. |
| 2006/0156385 | A1 | 7/2006 | Chiviendacz et al. |
| 2006/0218393 | A1 | 9/2006 | Hernandez et al. |
| 2007/0005967 | A1 | 1/2007 | Mister et al. |
| 2007/0015490 | A1 | 1/2007 | Munje et al. |
| 2008/0109899 | A1 | 5/2008 | Rijnswou |
| 2008/0301371 | A1 | 12/2008 | Peled et al. |

FOREIGN PATENT DOCUMENTS

| | | |
|---|---|---|
| FR | 2654238 | 5/1991 |
| WO | 99/24267 | 5/1999 |
| WO | 02/08974 | 1/2002 |
| WO | 02/17556 | 2/2002 |

OTHER PUBLICATIONS

English Translation of WO 91/06904; published May 16, 1991; corresponding to FR2654238 (Lefevre).

Chinese Office Action; Chinese Application No. 200510121789.7; dated Jun. 29, 2011.

EP Office Action; EP Application No. 04802268.5; dated Dec. 30, 2010.

Supplementary EP Search Report; EP Application No. 04802268.5; dated Aug. 4, 2010.

Supplementary EP Search Report; EP Application No. 05706404.0; dated Nov. 5, 2007.

Australian Office Action; Australian Application No. 2005297350; dated Jun. 1, 2009.

Chinese Office Action; Chinese Application No. 200480043373.1; dated Mar. 27, 2009.

Australian Office Action; Australian Application No. 2004319571; dated Mar. 13, 2009.

Chinese Office Action; Chinese Application No. 200510121789.7; dated Sep. 25, 2009.

SearchSecurity "TwoFactor Authentication"; Jun. 19, 2004; http://searchsecruity.techtarget.com.

Microsoft; "Account Lockout Beset Practices Whitepaper"; May 20, 2004; pp. 1-52.

Engineering Statistics Handbook; "Histogram"; Jun. 2004; pp. 1-3; http://www.itl.nist.gov/div898/handbook/eda/section3/histogra.html.

PFBlog; "Why Do Credit Cards Expire?"; Feb. 7, 2005; p. 1; www.pfblog.com/archives/1560_why_do_credit_cards_expire.html.

Tech FAQ "What is two Factor Authentication?"; pp. 1-2; Mar. 13, 2005 (Internet Archive Wayback Machine).

"RSA SecurID for Microsoft Windows"; RSA Security, Inc.; Brochure No. SIDMS DS0504; 2004.

EP International Search Report and Written Opinion; International Application No. PCT/IB2004/002234; dated Jan. 24, 2005.

PassMark; What are PassMarks?; from www.passmarksecurity.com; printed Apr. 21, 2005; p. 1.

The Dryad Numeral Cipherauthentication System; from https://hosta.atsc.eustis.army.mil; printed May 11, 2004; pp. 1-12.

America's Growth Capital; Authenticated Email Primer: Tumbleweed Jumps Into the Fray; Apr. 8, 2004; pp. 1-13.

The Anti-Phishing Working Group; Proposed Solutions to Address the Threat of Email Spoofing Scams; Dec. 2003; pp. 1-10.

Canadian International Search Report; International Application No. PCT/CA2005/000067; dated Jul. 18, 2005.

Canadian International Search Report; International Application No. PCT/CA2006/001562; dated Dec. 15, 2006.

Canadian International Search Report; International Application No. PCT/CA2006/002017; dated Mar. 30, 2007.

Canadian International Search Report; International Application No. PCT/CA2004/002091; dated Mar. 21, 2005.

* cited by examiner

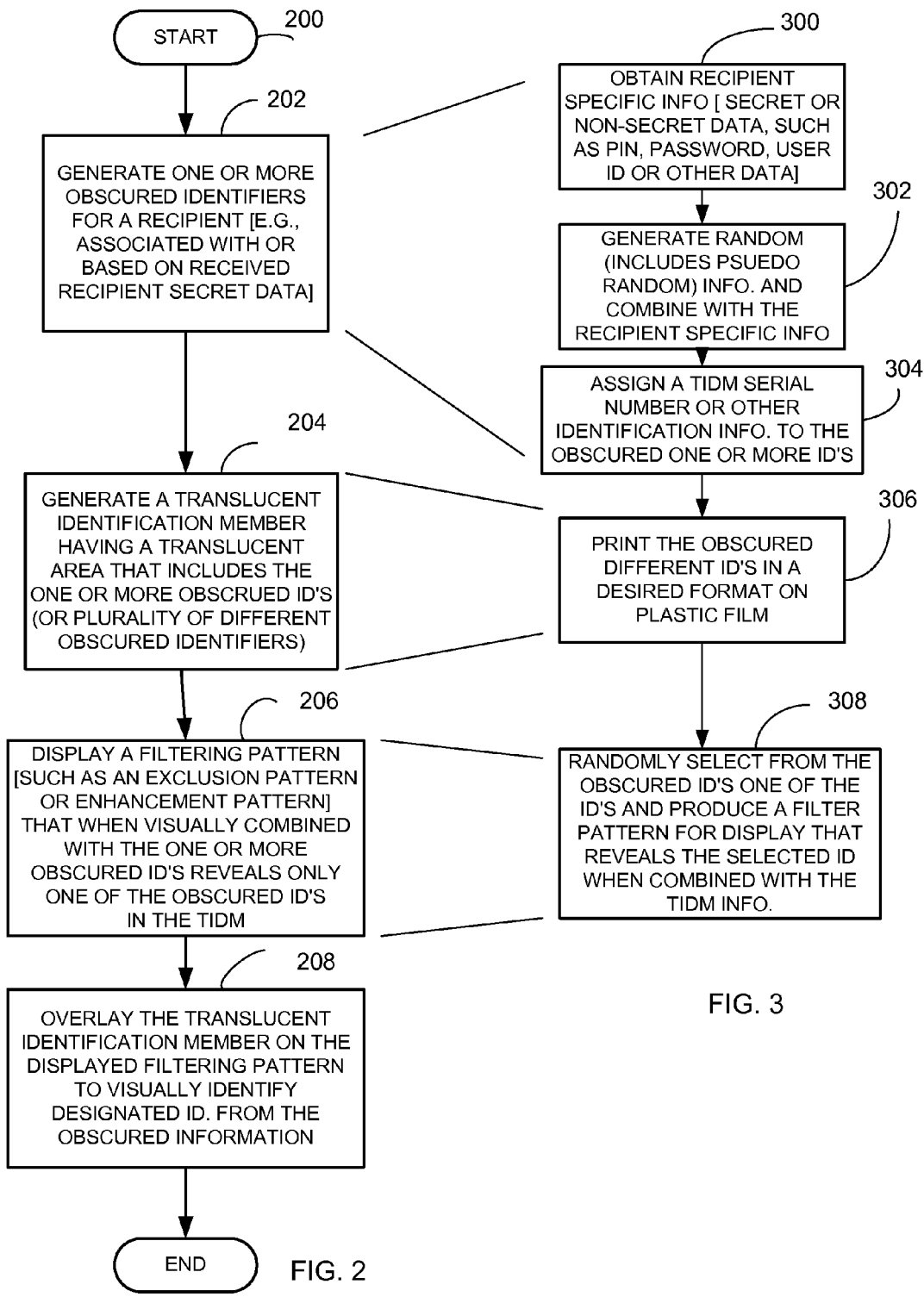

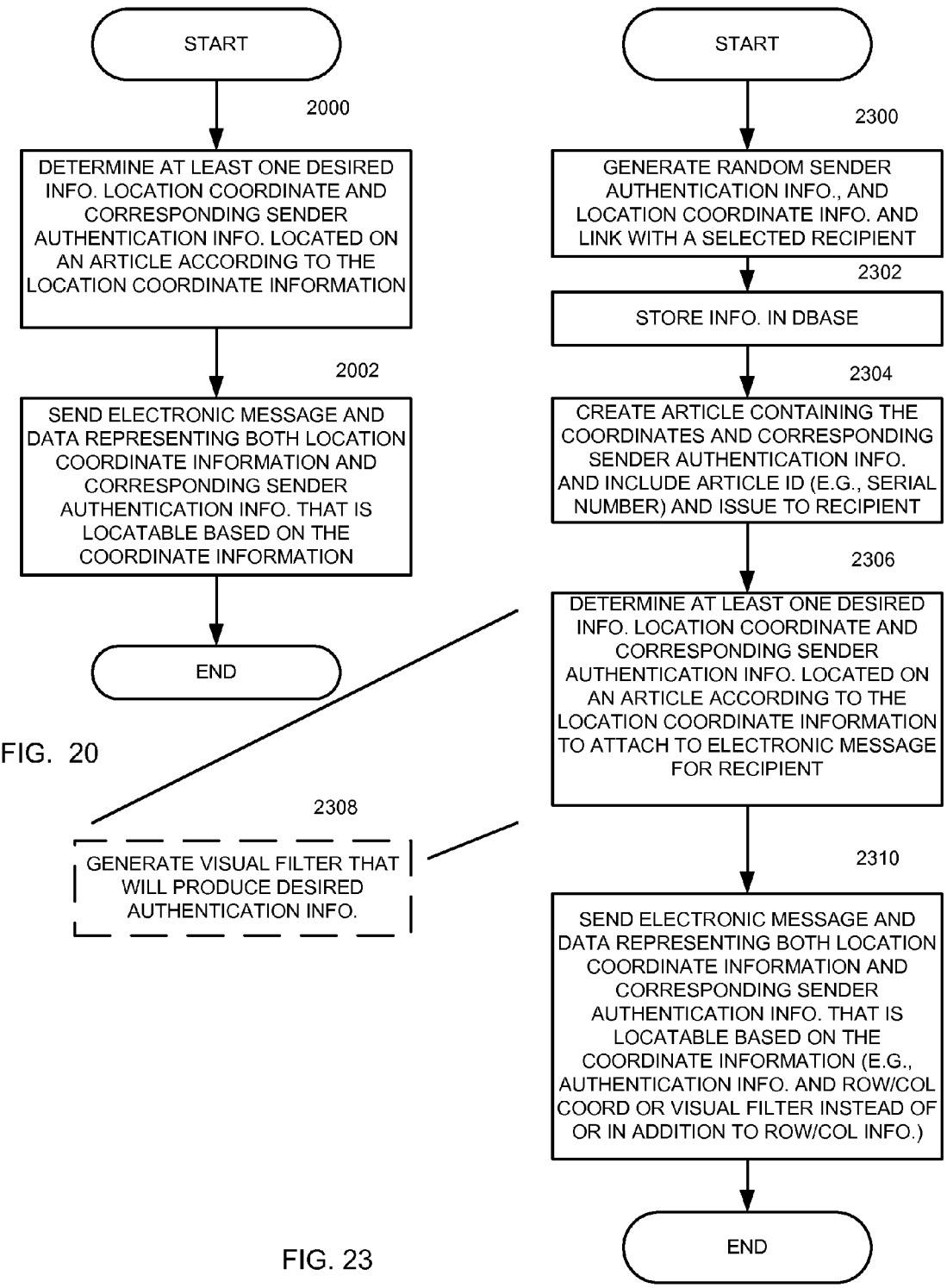

TRANSACTION CARD FOR PROVIDING ELECTRONIC MESSAGE AUTHENTICATION

RELATED CO-PENDING APPLICATIONS

This is a divisional of U.S. patent application Ser. No. 10/849,402, filed on May 19, 2004, entitled METHOD AND APPARATUS FOR PROVIDING ELECTRONIC MESSAGE AUTHENTICATION, having inventors Christopher Brian Voice et al., which is continuation-in-part of U.S. patent application Ser. No. 10/748,523, filed on Dec. 30, 2003, entitled METHOD AND APPARATUS FOR SECURELY PROVIDING IDENTIFICATION INFORMATION USING TRANSLUCENT IDENTIFICATION MEMBER, having as inventors Michael Chiviendacz et al. and owned by instant Assignee.

FIELD OF THE INVENTION

The invention relates generally to methods and apparatus for providing authentication of an electronic message sending entity, and more particularly to methods and apparatus that employ soft tokens or hard tokens for authenticating senders of electronic messages such as email.

BACKGROUND OF THE INVENTION

Ensuring that a sent email message or other electronic message has been sent by a sender that can be trusted, also referred to as being authentic, helps ensure against theft of important information by unscrupulous parties and can help limit spam and phishing. Phishing is a form of Internet scam that usually involves the mass sending of emails which appear to be from a legitimate organization such as a bank or other financial institution or other organization. These emails often direct the recipient to a fraudulent website or form where he or she is tricked into divulging personal or financial information. An alternative phishing scam may not ask for such information but, upon entering the URL, execute a download of a keystroke-logging program that lets the phisher harvest information from the recipient's machine. The information can then be used for identity theft and fraud.

Phishing attacks can be costly and can drain a company's resources since, for example a large number of attacks can be run against target companies in large volumes and billions of phishing messages pass through filtering systems that can slow down email delivery, use up valuable processing times of servers and can ultimately result in the loss of important financial data to unscrupulous parties.

Several solutions are known that attempt to address this problem. Because phishing attacks often begin with large volumes of email sent from a forged sending address, efforts to reduce spam email may be somewhat effective in reducing the number of phishing attacks. For example, one method referred to as Sender Policy Framework, an originator of a message or originator domain publishes in a directory or other suitable form legitimate sending computer addresses which are verified by receiving message transfer agents. The message transfer agent may verify a received message via a DNS server (domain name server). However, this technique can require widespread adoption of SPF-enabled message transfer agents which can potentially be costly to implement and deploy.

Another technique referred to as Coordinated Spam Reduction Initiative again requires originators in an originator domain to publish legitimate sending computer addresses which are verified by receiving message transfer agents in a relatively similar manner as described above.

Another technique requires domains to digitally sign email which is verified by the receiving message transfer agent via DNS servers. Again, this can require the widespread adoption of modified versions of message transfer agents.

Another technique uses the S/MIME protocol wherein sending individuals or domains digitally sign emails that are verified by receiving incoming message transfer agents or user email clients. This can require special email client features or recipient message transfer agents that are not currently supported in web based email clients.

Another technique employs a secret images that are shared between a sender and a recipient. As understood, a personalized image is sent by a user to an authentication server. The server stores the recipient sent image. The authentication server may then send the personalized image to the recipient with an email and the user seeing the image recognizes that it is the one he sent. Also, during logon to a site, the server may include the image in the logon page so that a user trusts the login page when the user sees their personalized image (see e.g., www.passmarksecurity.com). Among other drawbacks, this system appears to use the same image for multiple logins until the shared image is changed and may require the recipient to choose and send the image to a sending server.

In addition, other systems are known which attempt to provide, instead of sender authentication, recipient authentication. For example, U.S. Pat. No. 5,712,627 discloses, among other things, an issued identification card that has indicium at one of the addressable positions on an assigned card. The card may have rows and columns with different numbers, characters or symbols that are addressable by the rows and columns. To determine whether a person seeking access to data is authorized to obtain requested access, the identification card is distributed to authorized users. A requesting person seeking access provides the indicia at one or more addressable positions on the card as specified by a security system. To notify the person which indicium to enter and send back, the system selects coordinate indicia known to be present on a particular card. The recipient must then send back the indicia located at the address sent by the security system. If the indicia matches that assigned to the person seeking access then access is granted. However, such systems do not resolve the problem with respect to phishing since the system provides authentication of a receiver and not a sender and requests that a person seeking access identify themselves to the system and the system requires entry and sending by the user of information located on the security card.

Other authentication systems are also known that have been employed, for example, in the military, numeral cipher/authentication systems have been used that employ cards that are held by a sender and recipient. A transmission is made secure for example by using a challenge and reply authentication scheme. A sender of an electronic transmission for example may use the card and randomly select a letter from a row and column grid and transmit the letter. For a reply, the first letter of the challenge in the column is found and the second letter in the line indicated by the first letter is then communicated back. As such, the sender can then get confirmation. However, this also requires a reply by the receiver.

Another technique also uses a card that includes rows and columns of information on both the sender and receiver side, however, this transmission authentication scheme is used to authenticate transmissions. For example during transmission authentication, columns of transmission authentication diagraphs are located on the back of a cipher table and used to authenticate a sender. Column assignments are made by a designated representative such as a commander of a unit. The column assignments are known to both the sender and receiver apriori. Transmission authentication diagraphs are used only once. The first unused authenticator in the assigned column is used and a line is drawn through that authenticator to preclude its reuse. Such schemes do not utilize a random selection of information on the card and do not utilize the sending of coordinate information since the column information is known apriori. As such, only the authentication information is apparently communicated. If the sender sends authentication information and it is valid as determined by the recipient, the recipient crosses the authentication information off the card. The next time authentication is required, the next authentication information in the same column is then used. As such, a sequential and non-random approach is used. However, if the authentication card of a recipient is lost or obtained by an unscrupulous party, they would know how to act as a sender since they know which authentication information is next in the column since no random selection is utilized and since the card has markings thereon. In this system no coordinate information is sent since the column of information used to authenticate a sender is made known apriori to the sender and receiver. In addition, if the receiver does not receive the sender's transmission, the synchronization between the sender and receiver would be lost which may cause subsequent authentication attempts to fail.

Also, information security and user identification security are becoming increasingly important as technology becomes more sophisticated. For example, multi-factor authentication schemes are used in an attempt to thwart hackers or to thwart other inappropriate uses of information and user identities. For example, a two factor authentication scheme may use information known to a recipient or user such as a password or personal identification number (PIN) as well as some type of physical token such as a banking card, credit card, password token or other physical token which a user must be in physical possession of in order to initiate and complete an on-line transaction. Another level of authentication may include biometric authentication that may include the scanning of a fingerprint, eye or other biometric to again verify that the user attempting to gain access to a process, device, application or other right is in fact the appropriate user.

Transaction cards are known that may include for example smart cards, magnetic strip-based cards, and other transaction cards that facilitate banking transactions, credit card transactions, or any other suitable transactions. As known in the art, a user personal identification number (PIN) is usually required in addition to the possession of a banking card to obtain cash from a cash-dispensing machine or to otherwise carry out an online transaction. One known multi-factor authentication technique employs the use of a hardware token such as a battery operated smart card that displays a periodically changing and seemingly random number on a portion of the smart card. When a user wishes to execute a transaction with the smart card, for example, the user enters the seemingly random number that changes often. The receiving transaction server compares the received code entered by the user as displayed on the smart card with a corresponding number generated by a code source generator. If the code entered by the user matches the number generated by the code source generator, the transaction is approved and the user is granted a particular right such as accessing a bank account, purchasing goods, obtaining information, gaining access to a website or other software application, or any other suitable right as desired. However, such hardware tokens can be quite expensive and are battery powered thereby requiring changing of the battery and the potential of an electronic malfunction due to moisture problems or any other problems related to electronic circuitry.

Other smart cards that do not employ such screens typically require a card reader that reads, for example, a magnetic strip. This can be a restriction where a user wishes to perform an online transaction but is not sitting at a terminal that contains or has access to a magnetic strip reader.

In an apparently unrelated field, translucent cards are known such as plastic cards that contain a semi-transparent picture or pattern that when visually evaluated does not appear to connote any particular information. However, when the translucent card is held over a display with a corresponding background filter pattern, the combination of the pattern on the card with the background pattern on the display screen combine to present a visually recognizable message or word such as the word "sorry" or "you're a winner". These are static messages which are not unique to any user and typically include only a single message. Such plastic cards may be used for example to see if a holder has won a prize. The card for example may be mailed in the mail to members of a population. Those recipients then go to a web page identified on the translucent card or otherwise indicated in the mailing information to see if they have won a prize. However, such plastic cards do not provide multi-factor authentication, are not user specific, do not include multiple messages and typically include static messages.

Accordingly, a need exists for a method and apparatus that overcomes one or more of the above problems.

DETAILED DESCRIPTION OF THE DRAWINGS

FIG. 2 is flow chart illustrating one example of a method for securely providing identification information in accordance with one embodiment of the invention;

FIG. 3 is a diagram illustrating a further break down of the method shown in FIG. 2;

Figure 6:
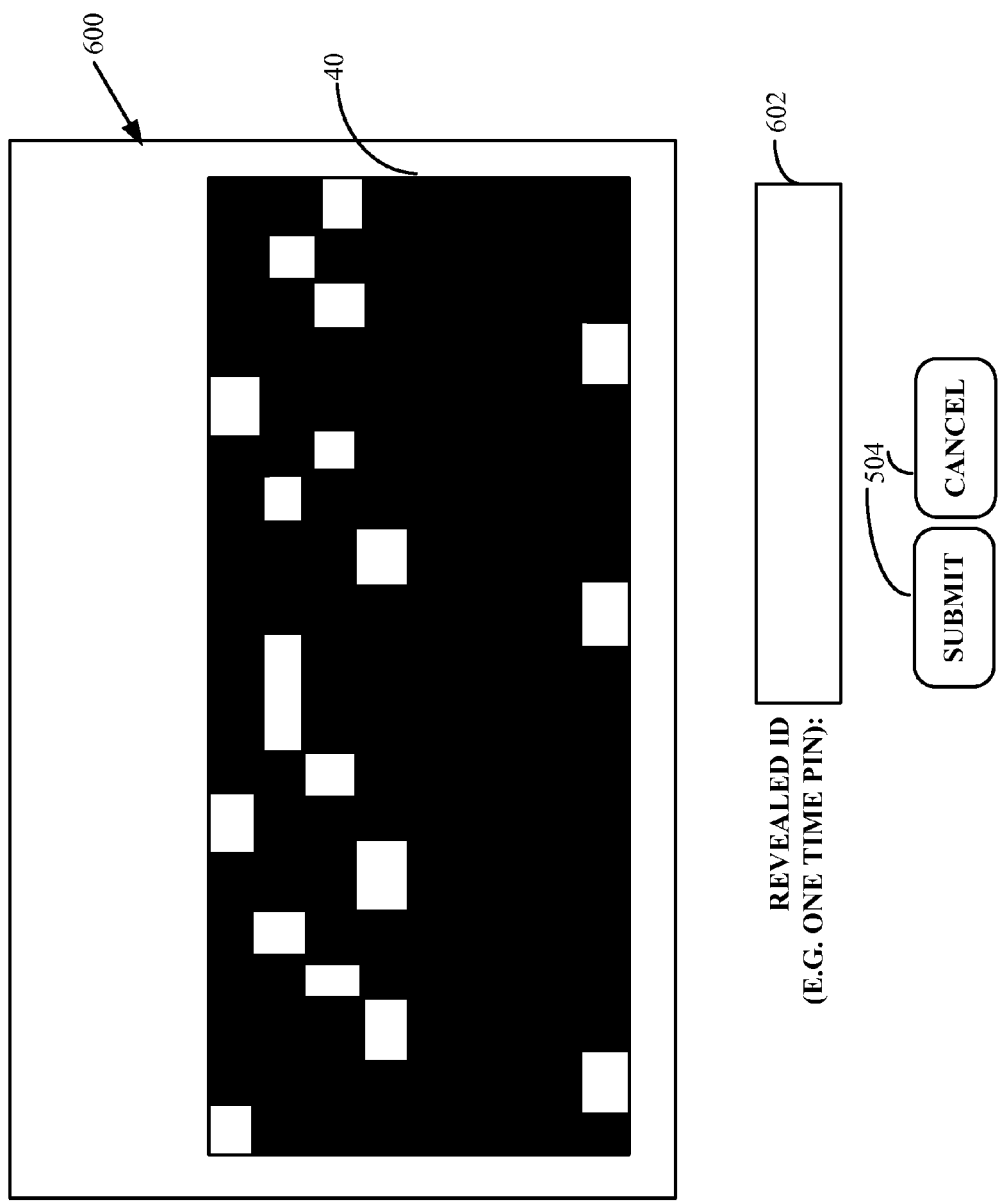
Figure 7:
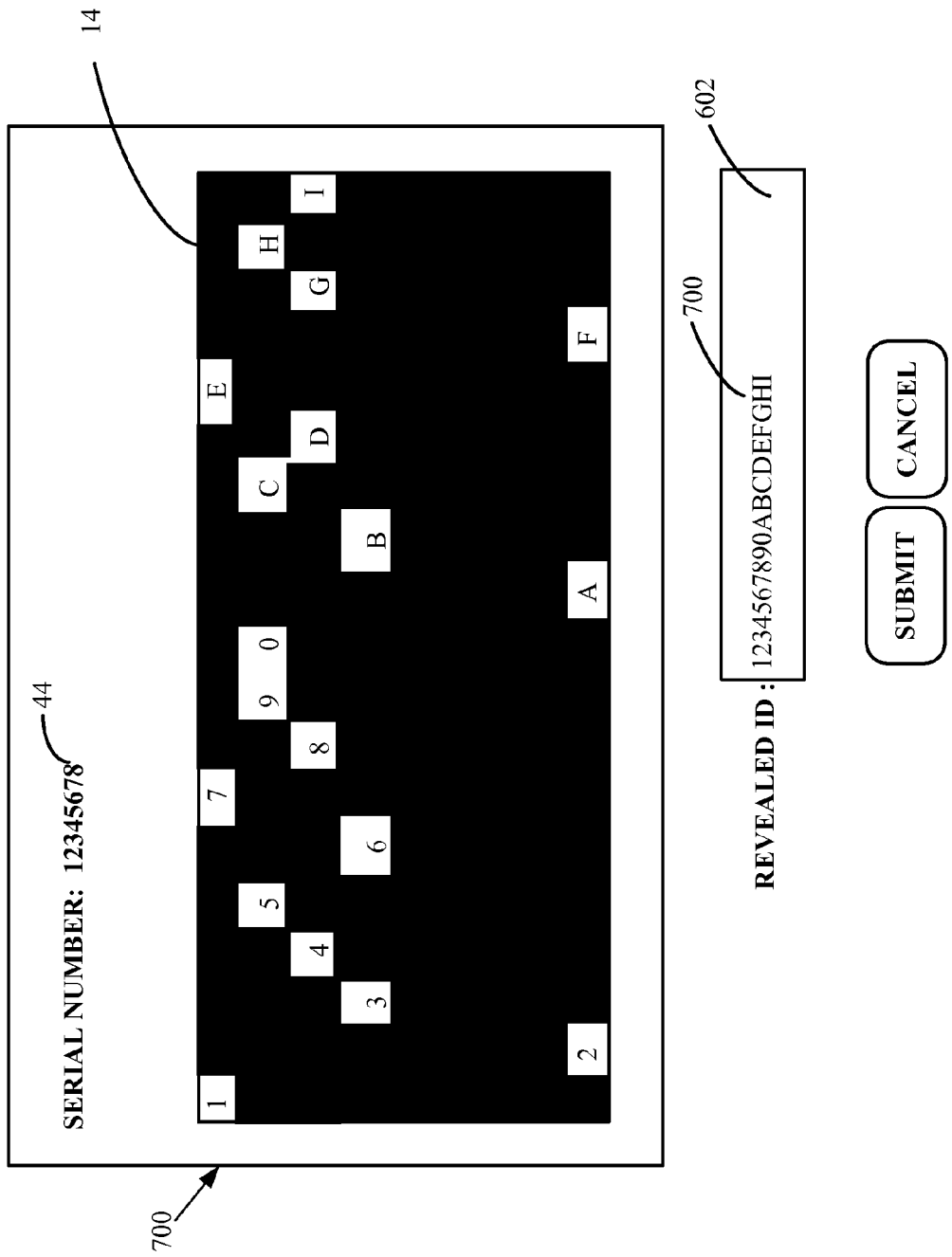
Figure 8:
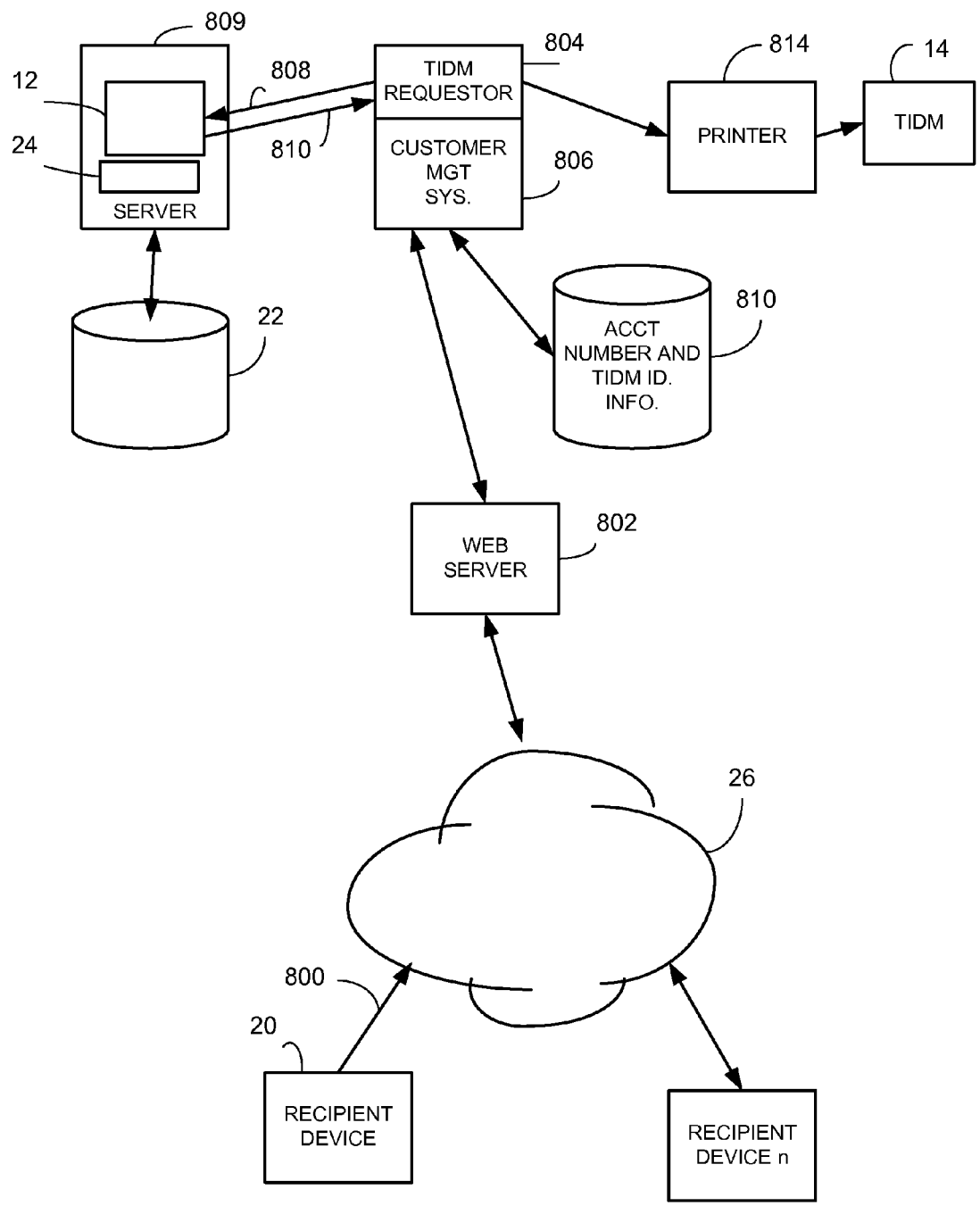
Figure 9:
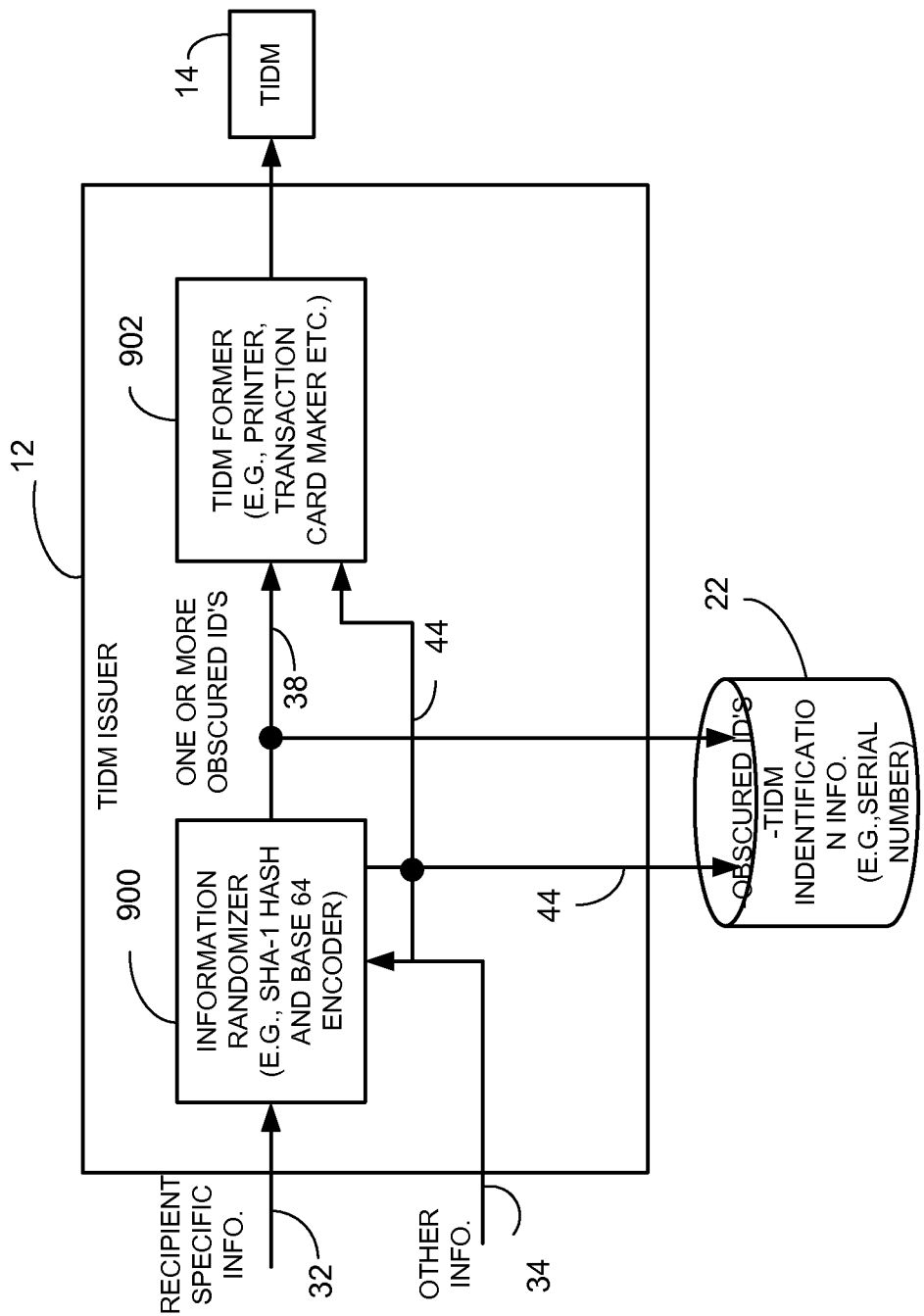
Figure 10:
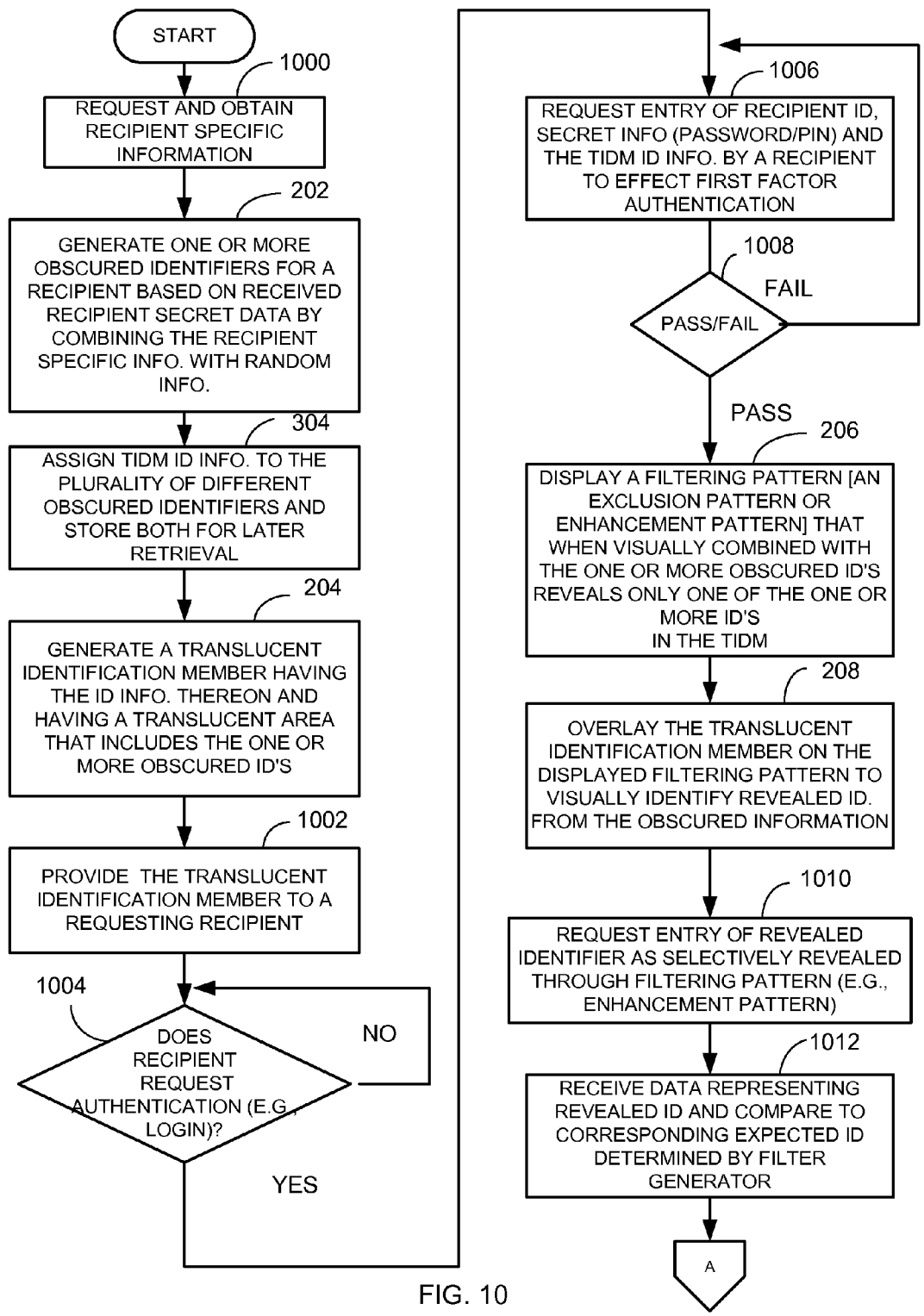
Figure 11:
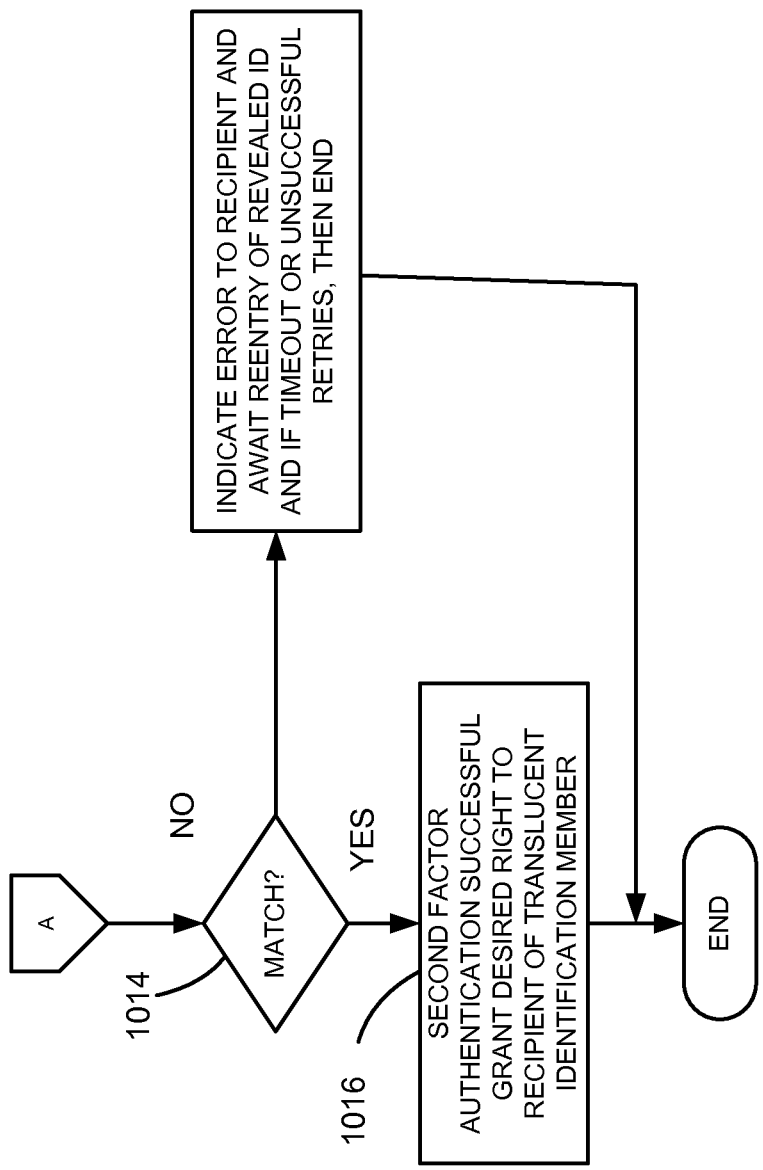
Figure 12:
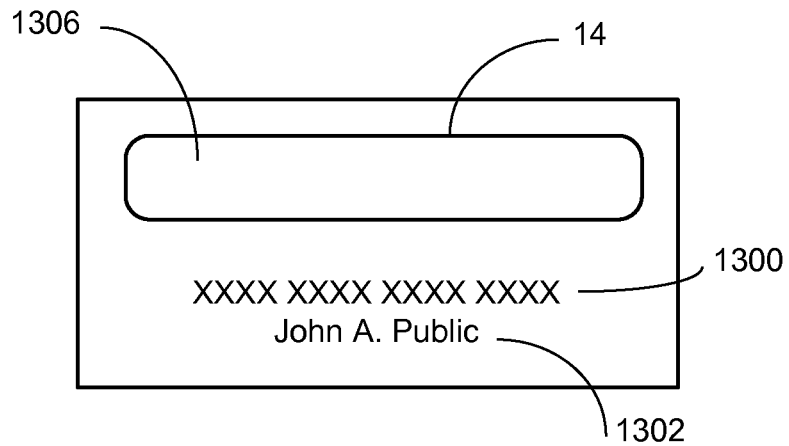
Figure 13:
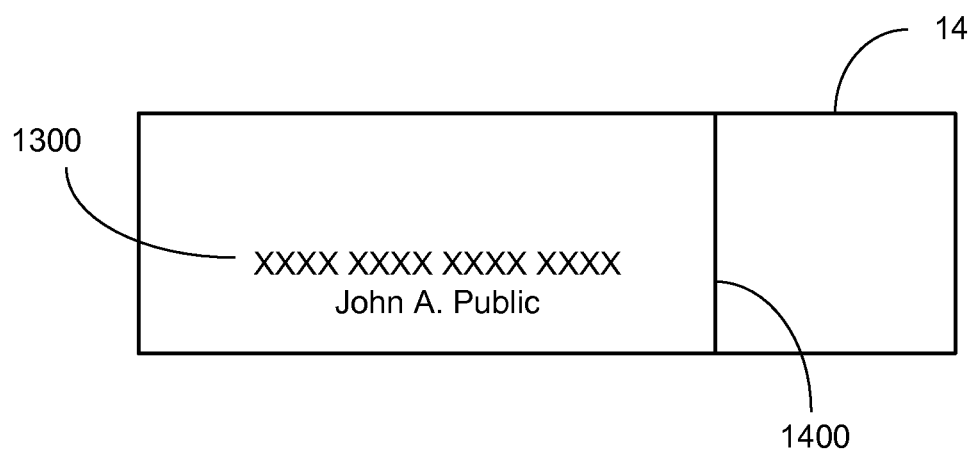
Figure 14:
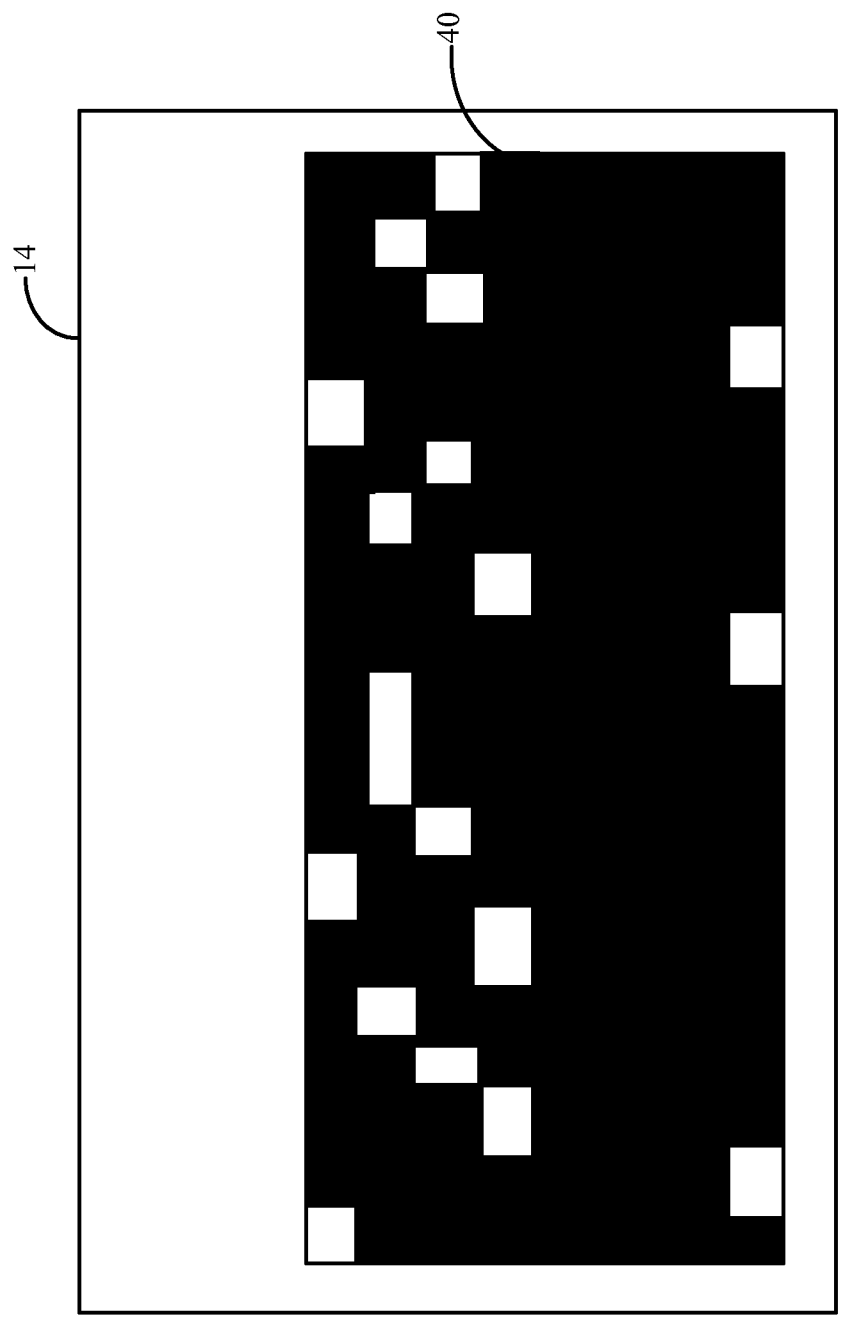
Figure 15:
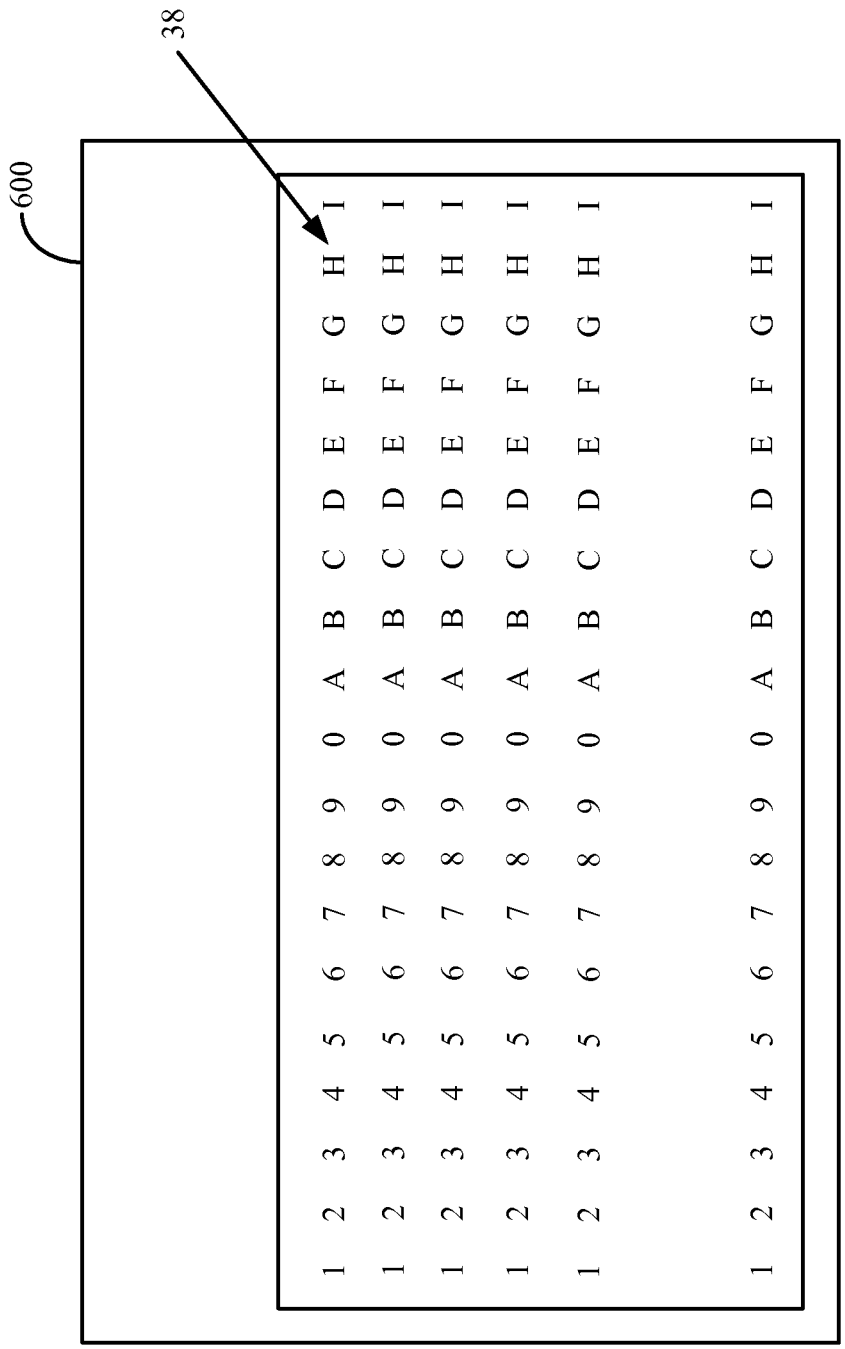
Figure 16:
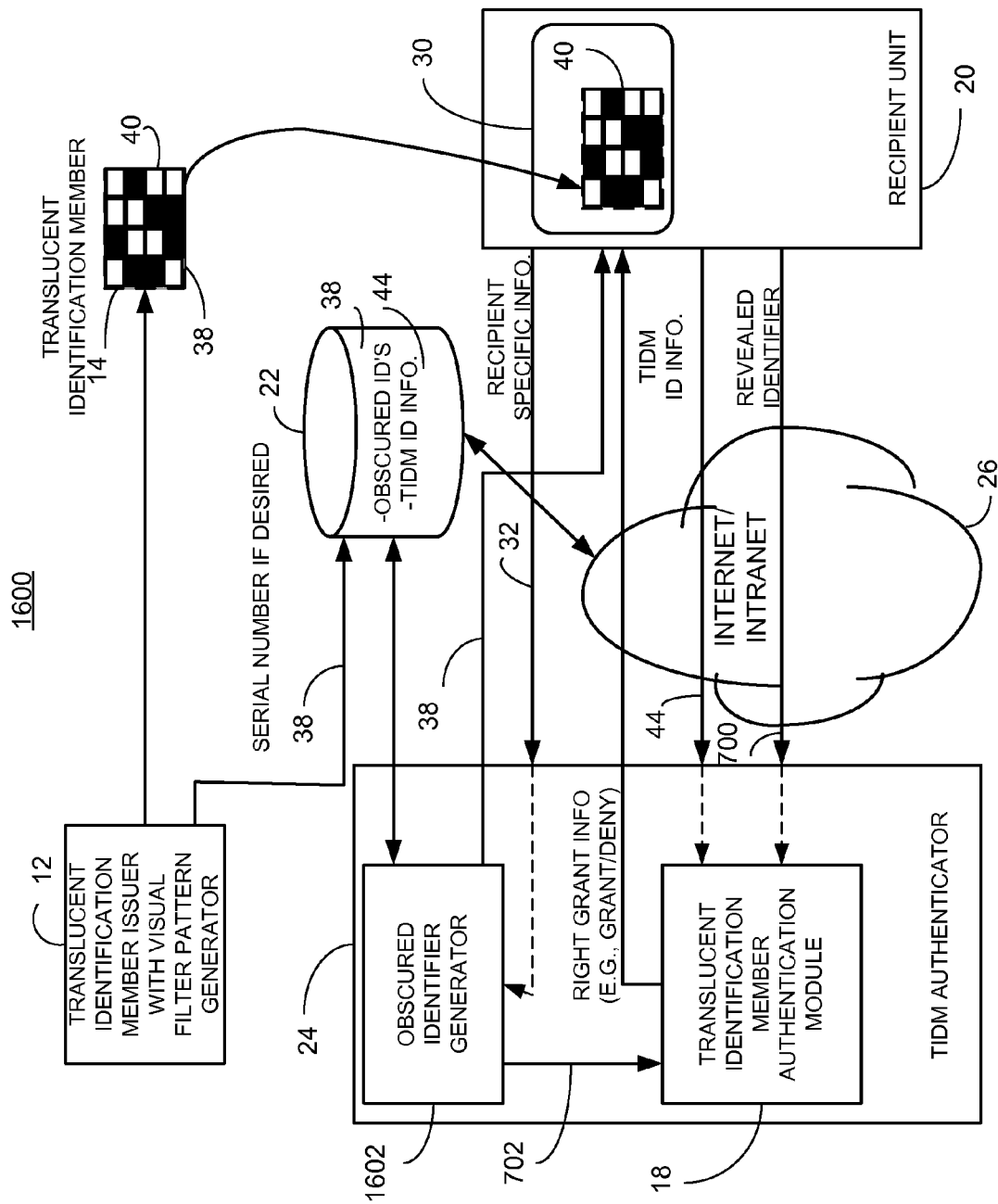
Figure 17:
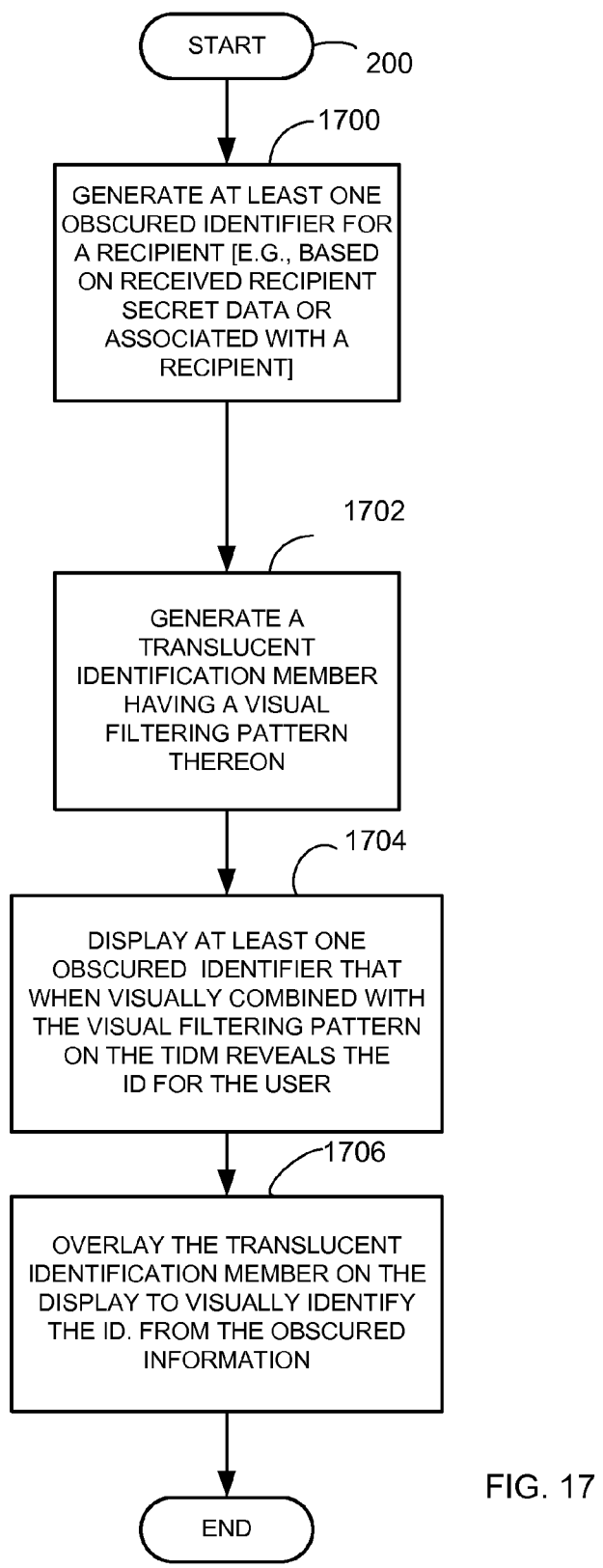
Figure 18:
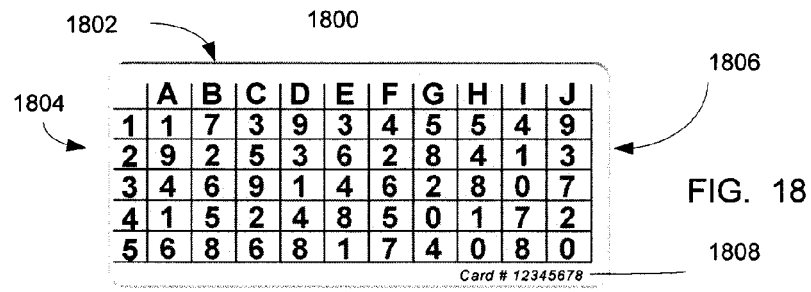
Figure 19:
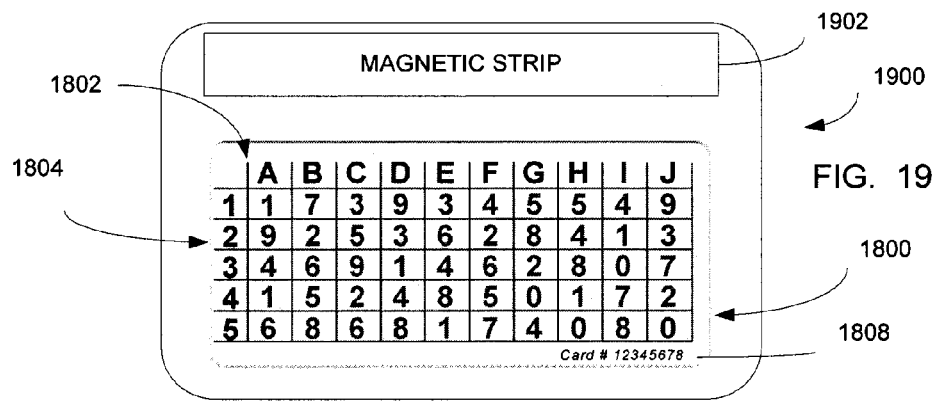
Figure 21:
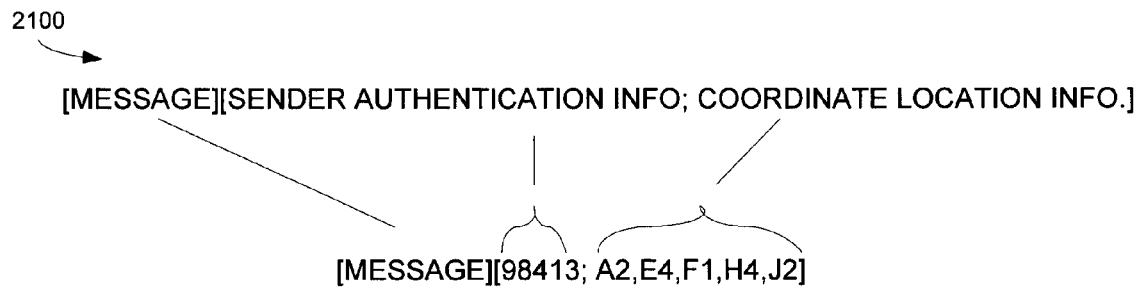
Figure 22:
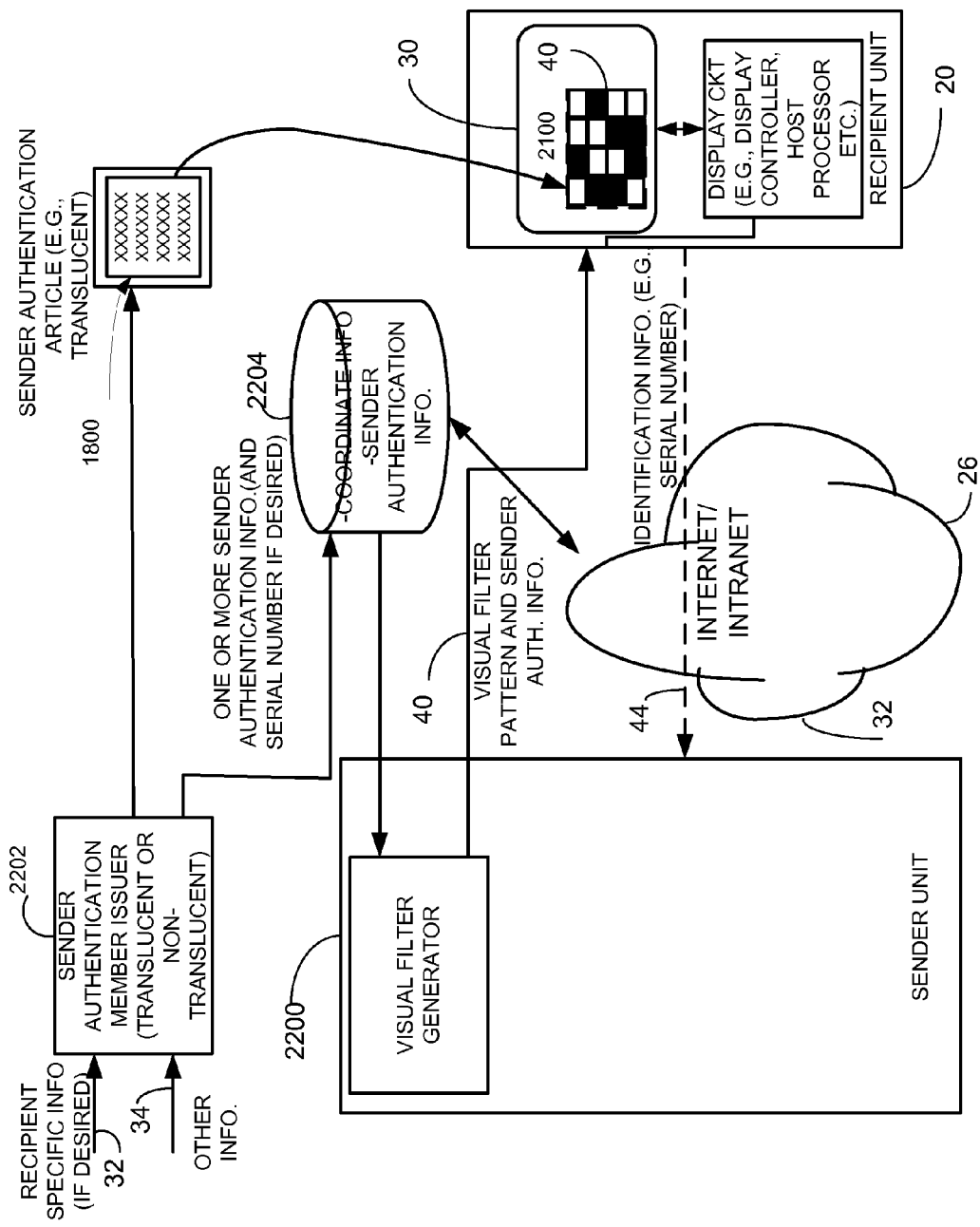

FIG. 6 diagrammatically illustrates one example of a displayed visual filtering pattern in accordance with one embodiment of the invention;

FIG. 7 graphically illustrates one example of a visually identified designated identifier from one or more obscured identifiers that are located on a translucent identification member in accordance with one embodiment of the invention;

FIG. 8 is a diagram of a system for securely providing identification information in accordance with one embodiment of the invention;

FIG. 9 is a block diagram illustrating in more detail one example of a translucent identification member issuer in accordance with one embodiment of the invention;

FIGS. 10 and 11 illustrate a flowchart showing one example of a method for securely providing identification information in accordance with one embodiment of the invention;

FIG. 12 illustrates one example of a transaction card including a portion containing a translucent identification member in accordance with one embodiment of the invention;

FIG. 13 illustrates another example of a transaction card that contains a translucent identification member in accordance with one embodiment of the invention;

FIG. 14 is a diagram illustrating one example of a secure identification information member in accordance with another embodiment of the invention;

FIG. 15 diagrammatically illustrates one example of displayed obscured identifier information in accordance with one embodiment to the invention;

FIG. 16 is a block diagram illustrating another example of a system for securely providing identification information in accordance with one embodiment to the invention;

FIG. 17 is a flow chart illustrating one example of a method for securely providing identification information in accordance with one embodiment to the invention;

FIG. 18 is an illustration representing one example of an article, such as a card, that may be used in a method for providing electronic message authentication according to one embodiment of the invention;

FIG. 19 illustrates one example of a transaction card that includes sender authentication information and location coordinate information for use in providing electronic message authentication in accordance with one embodiment of the invention;

FIG. 20 is a flow chart illustrating one example of a method for providing electronic message authentication in accordance with one embodiment of the invention;

FIG. 21 is a graphic illustration showing one example of a message with appended sender authentication information and location coordinate information in accordance with one embodiment of the invention;

FIG. 22 is a block diagram illustrating one example of a system for providing electronic message authentication in accordance with one embodiment of the invention; and FIG. 23 is a flowchart illustrating one example of a method for providing electronic message authentication in accordance with one embodiment of the invention.

DETAILED DESCRIPTION OF A PREFERRED EMBODIMENT OF THE INVENTION

Briefly, a method for providing electronic message authentication employs an article (also referred to as a member or token), such as a card, sticker, or any other suitable article, that includes sender authentication information and location information, such as row and column headings. In one example, each recipient of interest is issued an article that embodies sender authentication information that is identifiable by corresponding location information such as column and row identifiers. When the sender of an electronic message wants to send a message to a recipient of interest, the sender sends the electronic message and both location information and corresponding desired sender authentication information located at the location identified by the location information. This includes data representing the location and authentication information (such as an index to, a reference to, the location information or authentication information itself, or any suitable representation thereof). The recipient may then, in one embodiment, look on their article (e.g. card) at the corresponding location and see if the sent desired sender authentication information matches the sender authentication information located on the article (also referred to as expected sender authentication information). If a match occurs, then the recipient trusts the sender of the message. The recipient need not send back any information to the sender. As such, a simple card or other article may be used to authenticate a sender of a message to thwart phishing, or other sender authentication problems. Other examples will be recognized by those of ordinary skill in the art.

In addition, a system for providing electronic message authentication is also disclosed that carries out the above methodology, and a transaction card is also disclosed that includes the location information and sender authentication information thereon in the form of a sticker or as part of the transaction card itself. In yet another embodiment, the article may be a translucent article to allow light to pass therethrough so that a visual filtering pattern and sender authentication information may be sent by a sender along with the message. A user may hold up the article to a display screen and overlay it on the visual filtering pattern sent by the sender. If the resulting sender authentication information matches the results sent in the message, the recipient may trust the sender of the message.

In another embodiment, an apparatus and method for securely providing identification information generates one or more obscured user (e.g., recipient) identifiers for a recipient, such as a plurality of identifiers that are generated based on user secret data such as a password, personal identification number or other secret or non-secret information or identifiers that are not based on user secret data, such as the identifier being randomly generated and then associated with the user. In this case, no user-related information is used, but the identifier can still identify the user. In another embodiment, a single obscured identifier may be used.

In one embodiment, the method and apparatus generates a translucent identification member (TIDM), such as a portion of, or an entire, plastic card, sheet, film, or other suitable member that has a translucent area that includes the one or more obscured identifiers. As used herein, translucent area can also include a transparent area. For example, the translucent identification member may be made from transparent or clear sheets, including smoked plastic or other suitable coloring with the obscured identifiers (including non-character information) printed in ink or otherwise placed thereon or therein. The one or more obscured identifiers may be for example one-time authentication identifiers that are unique to a recipient of the translucent identification member. As such, the translucent identification member or card contains what appears to visually be a random pattern of information.

A corresponding visual filtering pattern is also generated for display on a display device when the user desires to use the translucent identification member. For example, the visual filtering pattern also appears to be random from a visual point of view but when visually combined with the one or more obscured identifiers on the translucent identification member, a designated one of the one or more obscured identifiers is visually revealed. In one embodiment, a user may overlay the translucent identification member over a designated portion of a display device or in the designated portion of a display that displays the visual filtering pattern. A combination of the visual filtering pattern with the pattern of different obscured identifiers on the translucent identification member combine to form a visually revealed single identifier or message from the one or more identifiers. Hence, for example in one embodiment, a seemingly random pattern is generated on a screen which helps ensure only a single identifier is exposed visually to a user that is viewing the translucent identification member which is overlaid on the visual filtering pattern that is being displayed on the display.

Accordingly, if desired, a security officer that has access, for example, to a translucent identification member issuer may use a package of blank cellophane cards that may be used to make the translucent identification members on a local printer. The translucent identification members may be printed having translucent color pattern that serves as the one or more obscured identifiers, or have other suitable indicia that appears to be semi-random or obscured to a user. Use of color or color background may also be used to defeat photocopying attacks. It will be recognized that portions of or all functions of the translucent identification member issuer may be provided through a distribution of providers and networks or through a web based service. For example, a recipient may access a TIDM issuance service through a web connection and locally print the TIDM or receive the TIDM through the mail. Also, identifiers can be provided by one party and sent to another party for printing or manufacturing. Other distribution of operations may also be employed as desired.

Once a visually revealed identifier is presented to a user, a user enters the visually revealed identifier through a user interface where it is compared to an expected identifier. If the entered identifier matches the expected identifier, proper authentication is indicated and a recipient may be granted access to a device, application, or process or other desired right (or submitted data is accepted—e.g. such as a vote). In addition, a list of revoked translucent identification members may also be maintained to prevent compromise due to theft or loss of translucent identification members. The list may be stored in any suitable location and updated by a service provider, translucent identification member issuer or any suitable entity. Since the translucent identification members do not require electronics to generate random numbers, the cost of such translucent identification members may be quite low and their reliability may also be relatively high since they are not susceptible to moisture or other damage typically associated with smart cards.

In an alternative embodiment, a smart card or other transaction card or non-transaction card (e.g., voting card or other suitable card) may include a translucent identification member if desired. Hence a transaction card is disclosed and includes for example a portion containing card identification information (such as a transaction card number, which may be impressed thereon such as through raised printing or electronically or through any other suitable storage mechanism such as magnetic strip or any other suitable mechanism), as well as a portion containing a translucent identification member that has a translucent area that includes one or more obscured identifiers. As such transaction cards such as credit cards, banking cards or any other transaction cards may include a window that contains the translucent identification member or may have a transaction identification number or other identification information affixed to a conventional transaction card to enhance security.

In another embodiment, the role of the translucent identification member and the recipient unit are reversed. For example, in this embodiment, the translucent identification member contains the visual filtering pattern and the display screen displays at least one obscured identifier that may be for example data representing user authentication data that is unique to a user, or other data if desired. The combination of overlaying the translucent identification member (visual filter) over the display that displays an obscured identifier, reveals (un-obscures) the at least one obscured identifier on the screen. The visual filtering pattern on the member stays the same since it is printed on the member, and the displayed obscured identifier is changed during each session or at other suitable intervals.

Accordingly, one or more of the following advantages may result. Since the translucent identification members can be printed by an organization security officer, no manufacturing costs need to be incurred and they can be generated locally for a recipient. Since there need not be electronics, there is no battery to be replaced and no damage from exposure to moisture need occur. No network or radio connectivity is required such as typically required by devices employing magnetic strips. The translucent identification member may be made of plastic or any other suitable material and in any suitable thickness. They are durable and easy to replace in the event of a compromise since they may be produced locally to an organization. Also investment in a substantial network infrastructure to continually generate master codes that are matched with dynamically changing codes on a screen and a smart card can be avoided.

Figure 1:
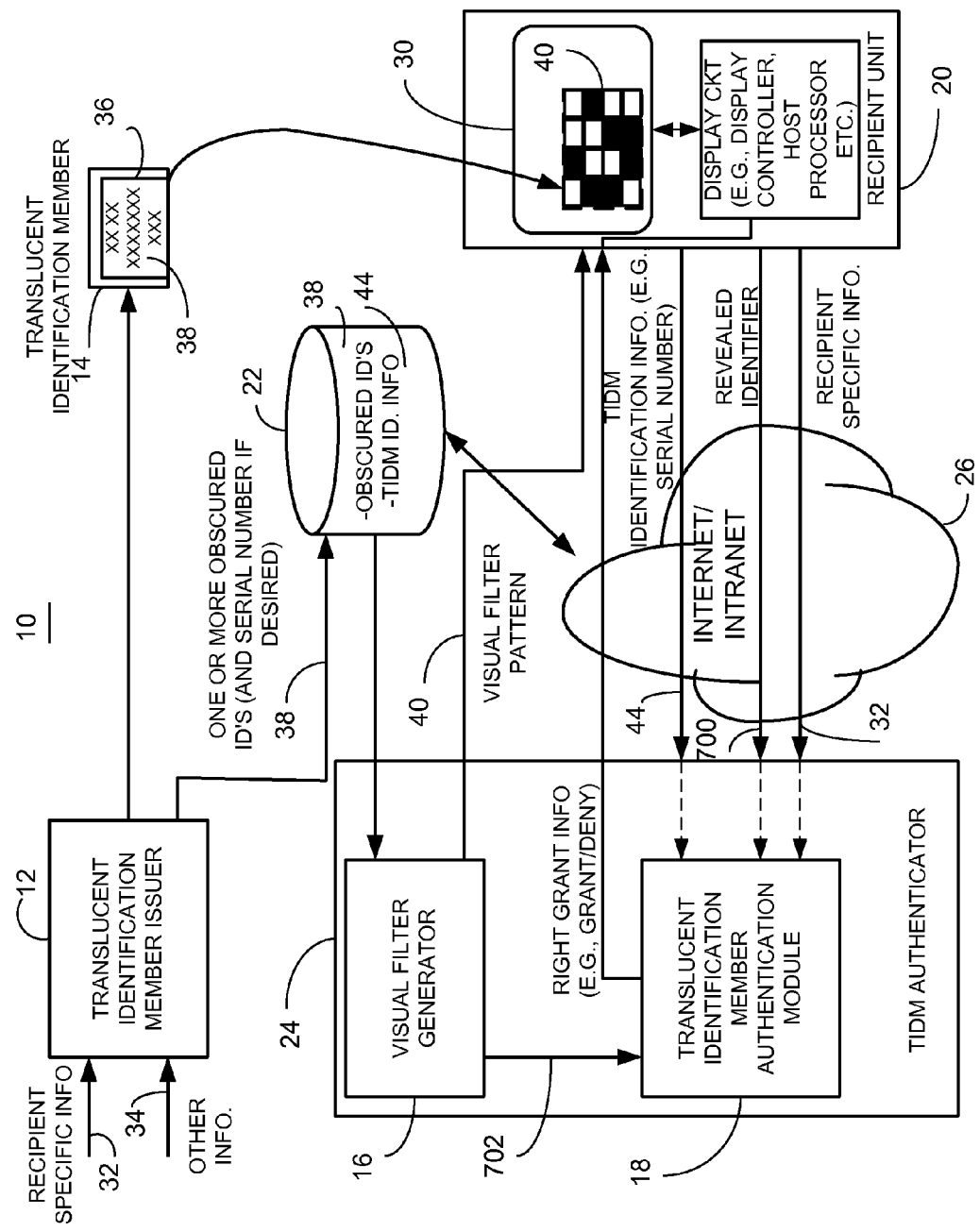
FIG. 1 is a block diagram illustrating one example of a system for securely providing identification information in accordance with one embodiment of the invention.

In one embodiment, the displayed visual filtering pattern selectively illuminates a portion of a translucent identification member to visually reveal one of the one or more obscured identifiers. The visual filtering pattern can be changed with each authentication session. The one or more obscured identifiers are printed indicia on a semitransparent (or transparent) card and is preferably unique within a particular domain of users. The one or more obscured identifiers are visually obscured through many suitable techniques such as color shading, ordering of the characters, a combination thereof or any other suitable visual obfuscation technique. FIG. 1 illustrates one example of a system 10 for securely providing identification information that includes a translucent identification member issuer 12 operative to generate a secure identification member such as translucent identification member 14, a visual filter generator 16, a translucent identification member authentication module 18, a recipient unit 20 and memory 22. In this example, the visual filter generator 16 and translucent identification member authentication module 18 are included as part of a translucent identification member authenticator 24 that may be implemented as one or more software modules executing on a computing unit such as a personal computer, work station, server, hand held device, or any other suitable device or multiple networked devices. The translucent identification member authenticator 24 is operatively coupled, in this example, to a web server which in turn is operatively coupled to a network such as the Internet 26 to facilitate web based communication between a recipient unit 20 and a translucent identification member authenticator 24. As such multiple circuits are formed by the software and processing device(s). Also, as used herein, circuits also refers to any suitable electronic logic in any suitable form including but not limited to hardware (microprocessors, discrete logic, state machines, digital signal processor etc.), software, firmware or any suitable combination thereof.

The translucent identification member issuer 12, the visual filter generator 16, and the translucent identification member authentication module 18 may be implemented in any suitable manner and is preferably, but not limited to, software modules executing on one or more computing devices that contain one or more processing devices that execute instructions that are stored in memory.

In this example, the translucent identification member issuer 12 will be described as a local server that generates the translucent identification member 14 using a printer or other suitable mechanism to generate a translucent identification member 14. The translucent identification member includes a translucent area that includes one or more obscured identifiers thereon. However, it will be recognized that the translucent identification member issuer 12 may be included as part of the translucent identification member authenticator 24, or may be located on any other suitable device including a web server and it will be recognized that any of the software programs described herein may be suitably located on any suitable device or devices as well.

The memory 22 may be any suitable local or distributed memory and may be located on a web server or locally if desired. The memory may be RAM, ROM or any suitable memory technology. The recipient unit 20 may be any suitable device such as a laptop computer, desktop computer, hand held device or any other suitable device that includes a display 30 and user interface, and may include one or more processing devices that execute instructions stored in any suitable memory. The recipient device includes the requisite circuitry to provide one or more user interfaces such as graphic user interfaces through web browsers or other applications or operating systems and may include speech recognition interfaces or any suitable user input interfaces. As such the units include a display circuit operative to display a visual filtering pattern defined such that when the visual filtering pattern is visually combined with one or more obscured identifiers located on a translucent identification member, a designated one of the one or more identifiers is visually revealed; and an input interface operative to receive data representing the visually revealed identifier. In one example, a user interface is used to request entry of a serial number associated with the translucent identification member; and request entry of the revealed identifier to determine whether to grant a desired right for the recipient.

Also if desired, a receiver unit can receive the filter or obscured identifiers for display on a display screen and send the response back through a completely different device (or through a completely different channel) such as a cell phone, by SMS message, email message or other suitable channel and/or device.

Referring also to FIGS. 2 and 3, a method for securely providing identification information will be described. As shown in block 200, a recipient sends a request into the translucent identification member issuer 12 through the Internet or through any other suitable mechanism to request issuance of a translucent identification member 14. This may be done for example by a recipient registering with an online financial institution with user-supplied data such as a password or other secret information. This is shown as recipient specific information 32 that is received by the translucent identification member issuer 12.

As shown in block 202, the method includes generating one or more obscured identifiers for a recipient, which may be based on, for example, the recipient specific information 32 and/or other information 34. The other information 34 may be a translucent identification member serial number or other suitable information if desired. This may be done for example by the translucent identification member issuer 12, or any other suitable entity. As shown in block 204, the method includes generating the translucent identification member 14 that has a translucent area 36 that includes one or more obscured identifiers 38. The one or more obscured identifiers 38 are generated by the translucent identification member issuer 12 in this example and stored in memory 22 in a database form. The one or more obscured identifiers are stored in memory 22 so that they may be subsequently accessed when it becomes necessary to create appropriate visual patterns 40 to reveal the desired revealed identifier 700 or when checking the returned revealed identifier 700.

Figure 4:
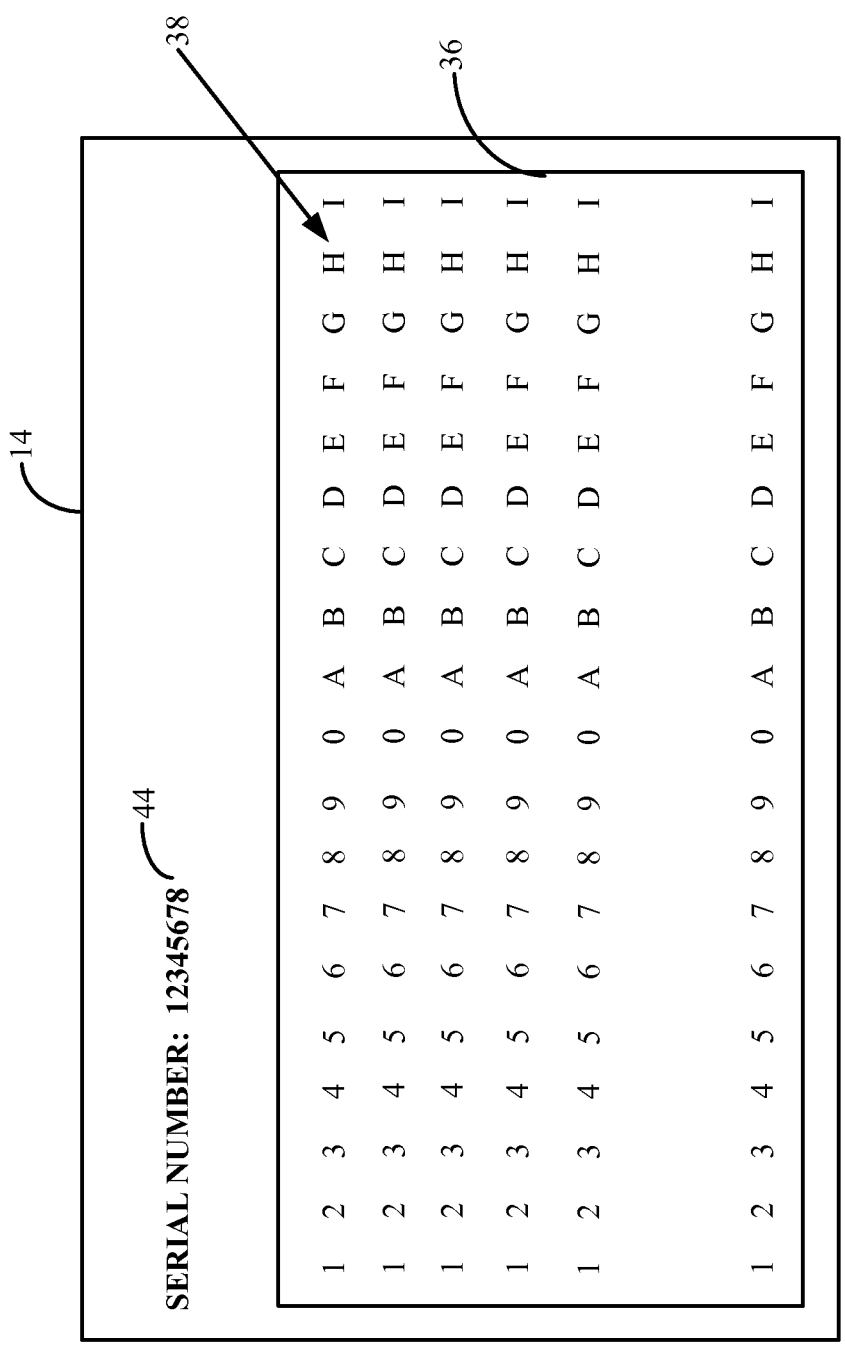
FIG. 4 is a diagram illustrating one example of a secure identification information member in accordance with one embodiment of the invention.

For example, the translucent identification member issuer 12 may control a printer to print a cellophane card as a translucent identification member 14 that has printed thereon one or more obscured identifiers. One example of a translucent identification member is shown in FIG. 4. The translucent identification member 14 can be made of any suitable material such as plastic or any other suitable material that provides some level of transparency so that a combination of the one or more obscured identifiers when overlayed on a display that emits light, allows the light energy (or lack of light energy) from the display to combine with the one or more obscured identifiers to visually designate one of the one or more identifiers on a translucent identification member. The one or more identifiers on a translucent identification member may also be a plurality of different obscured identifiers.

The translucent identification member 14 may be a card, sheet, film or other member that may include if desired any suitable adhesive or connecting structure to be applied over a window of transaction card, or any other suitable material. The translucent identification member may also be connected to a transaction card, such as, for example, by using a suitable connecting structure to join the translucent identification member to an end or side of a transaction card. The one or more obscured identifiers 38 that are printed on the translucent identification member 38, as noted above, may be characters (e.g., ASCII), symbols, print patterns, colored versions thereof or any other suitable indicia. The one or more obscured identifiers 38 appear to be visually obscured and hence seemingly random when viewed by a recipient. In other embodiments it may be desirable to print patterns of ink that do not connote characters but instead visually conceal a message or other information so that when overlayed on top of a display the pattern generated by the display in combination with the printed image, allows the viewer to visually decipher a revealed identifier.

The translucent area 36 includes an information pattern that represents one or more identifiers that may be unique identification information that may be used for one or more authentication sessions or other purposes. The information pattern represented by one or more obscured identifiers is preferably unique to a given domain of users to reduce the likelihood of the same user obtaining a same translucent identification member with the same obscured identifiers. The translucent area 36 is configured (e.g. sized) to overlay at least a portion of the display screen 30 on the recipient unit 20. In one embodiment, each of the one or more obscured identifiers may serve as one-time authentication identifiers for the recipient of the translucent identification member. It is noted, as used herein, identification information includes any information used to directly or indirectly authenticate a user (e.g., TIDM recipient) or other process of interest, or to get access to a desired right associated with a process or device, or any other suitable information that is intended to be kept secret except at the time a transaction is to be effected.

To make the TIDM, the method may include receiving a request from a user for one or more obscured user identifiers and recording a link between the user and the identification information associated with the one or more obscured user identifiers. The method may include providing the one or more obscured user identifiers to the user wherein the one or more obscured user identifiers are on a translucent identification member that is sent to the user, the one or more obscured user identifiers are sent to a third party to be placed on a translucent identification member for the user, the one or more obscured user identifiers are sent to the user for placement on a translucent identification member, and the one or more obscured user identifiers are selected from a pre-existing pool of obscured user identifiers. The request from the user may include user specific information and the user specific information may be used to create the one or more obscured identifiers or may be combined with other information to produce the one or more obscured user identifiers.

As shown in block 206, once the translucent identification member 14 has been generated and provided to a recipient, the visual filtering generator 16, or other suitable mechanism generates a visual filtering pattern for display on the display 30 of the recipient device. When the visual filtering pattern 40 is displayed by the recipient device, the visual filtering pattern visually combines with the one or more obscured identifiers located on the translucent identification member 14, to designate one of the one or more identifiers. In other words, the visual filtering pattern filters out undesired identifiers to reveal a selected one of the one or more identifiers.

As shown in block 208, the method may include overlaying, such as by a recipient, or a device, the translucent identification member 14 on the displayed filtering pattern 40 to visually identify a designated one of the obscured identifiers on the translucent identification member 14. The visually identified identifier is then entered by the recipient to facilitate a transaction or gain access to a specific desired right associated with any process or device of interest.

As shown again in FIG. 3, the steps of FIG. 2 are presented in more detail. As shown in block 300, generating one or more obscured identifiers for a recipient may be done for example by the translucent identification member issuer 12 or any other suitable entity by obtaining recipient specific information, such as secret or non-secret data or non-user related information. This process may also be accomplished by using non user-related and non user-supplied material, in which case, the generated one or more obscured identifiers are subsequently associated with a user. When recipient specific information is used, this may be a personal identification number, password, user name, account number or other data provided by the recipient through the recipient unit 20 or from any other suitable source. This is indicated as recipient specific information 32. As shown in block 302 the recipient specific information 32 is suitably combined, such as through a suitable mathematical function or algorithm, to produce the one or more obscured identifiers 38. The other information 34 may be, for example, output generated from a random number generator, the actual translucent identification member serial number 44 (or other TIDM identification information) that may be printed on the translucent identification member 14 or stored by the translucent identification member issuer 12, or any other suitable information. As shown in block 204, a translucent identification member serial number, or any other suitable information for identifying the translucent identification member, is assigned to the obscured one or more identifiers 38. It will be recognized that upon an initial request or generation of a translucent identification member that the translucent identification member issuer 12 may select a translucent identification member serial number and associate therewith the recipient specific information 32. This information may be combined to generate the one or more obscured identifiers 38. The translucent identification member serial number 44 may be stored in memory 22 for later use by the translucent identification member authenticator 24 (authenticating a recipient using the translucent identification member 14). The order of the steps as described herein with respect to any method may be suitably reordered based on a desired result.

As shown in block 306, generating the translucent identification member 14 may include printing the obscured different identifiers in a desired format on a plastic film, sheet or card to produce the translucent identification member 14. As shown in block 308, displaying the filtering pattern 40 on a display may include randomly selecting, from the obscured identifiers, a selected identifier to produce a visual filtering pattern 40 on display 30 that reveals the selected one of the obscured identifiers as the identifier to be revealed when the translucent identification member 14 is overlayed on the visual filtering pattern 40.

As shown in FIGS. 4 through 7, and to further illustrate an example, as shown in FIG. 4, the translucent identification member 14 has printed thereon the translucent identification member serial number 44 or other identification information and the one or more obscured identifiers 38 printed in the translucent area 36. As noted above this may be printed on cellophane material or other material readily accommodated by conventional printers, if desired, to reduce fabrication costs. However any suitable material or manufacturing process may be used. Once the recipient is in possession of the translucent identification member 14, multi-factor authentication is provided using the translucent identification member 14.

The filter may be generated in any suitable way. For example, a selected obscured identifier may be chosen from the stored one or more obscured identifiers whose position on the TIDM is defined. The visual filter pattern generator 16 produces a filtering pattern based on a predefined layout of the TIDM to insure that the filter blocks the proper character locations. Any other suitable technique may also be used.

Figure 5:
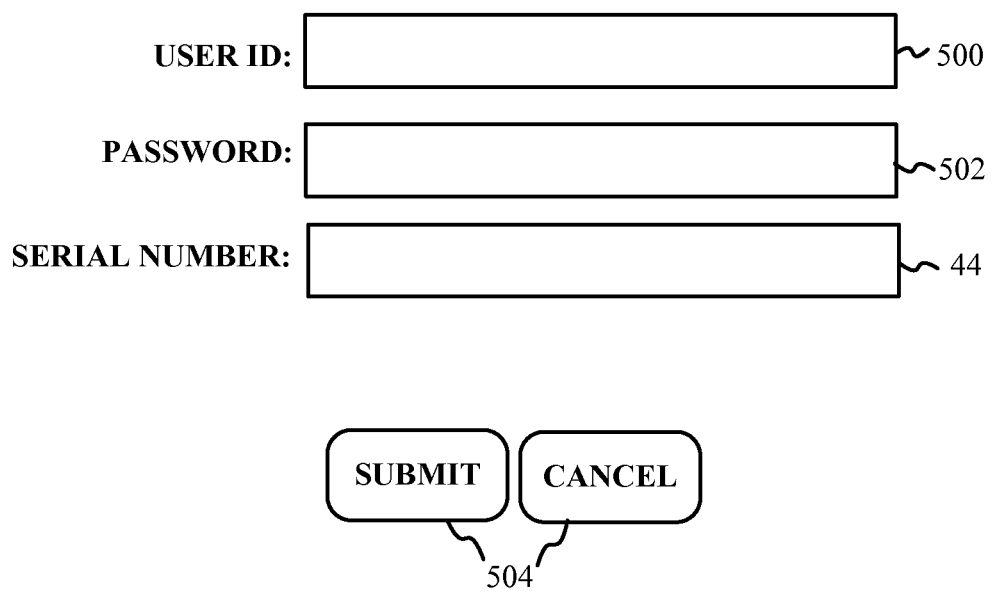
FIG. 5 is a diagram graphically illustrating one example of a login screen to facilitate authentication of a user or for securely providing identification information in accordance with one embodiment of the invention.

As shown in FIG. 5, the recipient device 20 may display, through a web browser or other suitable user interface, an input screen, based on a received HTML page if a web browser is being used, containing fields that receive user input such as a user identifier field 500, a password field 502 and the translucent identification member serial number field 44. The user submits the entered information through suitable interface buttons 504. This information is then sent to the web server via the Internet and if desired forwarded to the translucent identification member authenticator 24. As shown in this example the information entered in user ID field 500 or the password field 502 may be considered recipient specific information 32 that was previously entered when the translucent identification member issuer 12 initially generated the translucent identification member 14.

FIG. 6 illustrates one example of a graphic user interface (generated based on a received HTML page) displayed on display 30 to facilitate securely providing identification information using the translucent identification member 14. The graphic user interface may be generated for example through a web browser and suitable host processor on the recipient unit or any other suitable processor, and indicates an overlay area 600 that may be the same size or a different size than a visual filtering pattern 40 that is presented on the display 30. Hence in response to the login screen shown in FIG. 5, the translucent identification member authenticator 24 submits a response containing the visual filtering pattern 40 and the response interface screen shown in FIG. 6. The recipient unit 20 displays the visual filtering pattern 40 and a revealed identifier field 602 to allow entry of the one revealed ID from the one or more obscured identifiers.

FIG. 7 graphically illustrates the condition where the translucent identification member 14 is overlayed on top of the visual filtering pattern 40 to reveal one of the one or more obscured identifiers. The user positions the translucent identification member 14 and hence the one or more printed obscured identifiers 38 over the visual filtering pattern 40 and the combination of the visual filtering pattern 40 and the printed different obscured identifiers 38 reveals in this example a revealed identifier 700 which is then entered by the recipient in the revealed identifier field 602. The user then submits the revealed identifier 700 to the translucent identification member authenticator 24 to authenticate the user for the particular transaction or for access to a particular right. Accordingly, the translucent identification member authenticator 24 receives data representing the revealed identifier 700 in response to a user or other entity overlaying the translucent identification member 14 on the display 30. The translucent identification member authentication module 18 compares the received revealed identifier 700 with a corresponding expected identifier 702 (see FIG. 1) to determine whether proper authentication of the recipient is appropriate. The translucent identification member authentication module 18 obtains the corresponding expected identifier 702 from the memory 22 or may generate the expected identifier on the fly knowing the visual filter pattern and accessing the obscured identifiers 38, or may obtain the expected identifier 702 in any other suitable manner.

Referring to FIGS. 8 and 9 the issuance of a translucent identification member 14 will be described in more detail by way of an exemplary embodiment. In order to obtain a translucent identification member 14, a recipient registers with an online bank or other institution using recipient specific information 32 such as an account number or other information as indicated by registration request 800. This request is then passed through to a web server 802. The web server 802 then communicates with a bank server 804 which includes for example a customer management system and translucent identification member requester 806 which may be a suitable software application executing on a processing device if desired or any other suitable structure. The bank server 804 then generates a translucent identification member issuance request 808 to the translucent identification member issuer 12 which may be included in or separate from a suitable server 810. The translucent identification member issuance request 808 includes the recipient specific information 32 entered by the user. In response, the translucent identification member issuer 12 provides the obscured identifiers 38 in a response message 810 and generates and records a translucent identification member serial number 44 in the memory 22 along with the associated obscured identifiers 38 that will appear on the translucent ID member 14 for the requesting recipient. In this example, the bank server 804 links the recipient's account with the translucent identification member serial number 44 and then stores the linked information in a database 810 for later use. The bank server 804 then generates the translucent identification member 14 by, for example, formatting the obscured identifiers 38 for printing and sending the information to a printer 814 or other device which then prints out or manufactures the translucent identification member 14. Hence the translucent identification member serial number 44 is assigned by the translucent identification member issuer 12 and is associated (e.g., linked) with the one or more obscured identifiers 38 and with the user in memory 22 in a database.

The translucent identification member issuer 12 may include an information randomizer 900 and a translucent identification member formatter 902. The information randomizer 900 may use the translucent identification member serial number 44 as other information 34 to be combined with the recipient specific information 32 to generate the one or more obscured identifiers 38. This may be done using a hash algorithm or other suitable encoding technique as desired to generate the one or more obscured identifiers 38. The translucent identification member formatter 902 may be another software application executing on a suitable processing device or devices that formats the information for output to a printer or other manufacturing device.

FIGS. 10 and 11 illustrate another embodiment of the operation of the system after the issuance of the translucent identification member has occurred. As shown in block 1000, the method includes requesting and obtaining recipient specific information 32 such as previously described with reference to FIG. 5. Once the translucent identification member 14 has been printed or manufactured, it is then provided to the recipient by hand or through mail or any other suitable technique as shown in block 1002. As shown in block 1004, a bank server of a bank determines if a recipient has requested authentication, such as to a logon request. If a request has been received, a web page may be sent requesting entry of the recipient information 32 including the password and the translucent identification member serial number 44 as a first level of a multi-factor authentication process as shown in block 1006. This may be done for example through the screen shown in FIG. 5. As shown in block 206, the bank server determines whether the entered recipient specific information 32 and password and translucent identification member serial number 44 are correct for example by passing along the information to the translucent identification member authenticator 24. If the first authentication level passes, the method includes, as shown in block 1010, displaying the visual filtering pattern 44 that when visually combined with the one or more obscured identifiers 38 on the translucent identification member 14, reveals only one of the one or more obscured identifiers as the appropriate identifier to be entered for the current session or transaction. The bank server may then, through the web server, request entry of the revealed identifier 700 as selectively revealed through the filtering pattern displayed on the display by providing the screen as shown in FIG. 6. This is shown in block 1010. In response to the request, the translucent identification member authenticator 24 receives the revealed one time use identifier 700 and compares the received identifier to a corresponding expected ID determined for example by the visual filter generator or authenticator 24. This is shown in block 1012. Given the "filter", the user's data entry and stored information about that user, the authenticator can validate whether the user entered correct data or not (either on its own or by passing it to a "server"). If the desired identifier is generated before requesting it from the user, the system also generates the right filter to reveal the pre-determined identifier (all before presenting to the user). Alternatively, if the user is provided with a pattern (the filter) and then the system validates the identifier that the user entered with the identifier that would have resulted from that pattern, a desired identifier need not be picked ahead of time and the "filter generator", therefore does not require knowledge of anything else. The data representing the visually revealed identifier (e.g., the date itself, an encrypted form thereof or other suitable data, may also be received using a device other than the device on which the visual filtering pattern is displayed. For example, the identifier may be revealed on a screen of one device and a handheld device or non-handheld device may be used to enter and send the visually revealed identifier to another device or system that checks whether there is a match.

As shown in block 1014 if a match does not exist, the recipient will be sent an error and requested to re-enter the revealed identifier. The system may change to using a different identifier for the re-try. Also, the system may lockout the user after a certain number of failed attempts. However, as shown in block 1016, if a match occurs, second factor authentication is determined to be successful and the user is granted the desired right.

FIG. 12 and FIG. 13 illustrate examples of transaction cards that employ translucent identification members 14 (including the type shown in FIG. 14). The transaction cards may be smart cards or non-smart cards and have the conventional information associated with credit cards, debit cards, or any other suitable transaction cards and in addition include the translucent identification member 14. The translucent identification member 14 appears on a portion of the transaction card. One portion of the transaction card includes account information such as an account number, credit card number, or any other suitable identifier 1300 and if desired, other user identifiers such as a user name 1402. In an example shown in FIG. 12, the transaction card includes an opening 1306 that may be, for example, cut in the plastic transaction card or otherwise provided in the plastic card and a translucent identification member 14 with adhesive may be placed over the opening or may be integrally molded therein or otherwise attached such as but not limited to a connecting structure configured to receive and hold the TIDM in or to the transaction card so that the size of the transaction card is the same size as conventional transaction cards or any other suitable size as desired. If used, the connecting structure may be a snap fit structure, slide in structure, adhesive based connection or any suitable connecting structure as desired.

FIG. 13 illustrates a different example in which the translucent identification member 14 is attached to a side surface or any other surface of a conventional transaction card. The translucent identification member 14 may be foldable along a fold line 1400 or may be of a thickness wherein it is non-foldable and formed as part of the transaction card if desired. Any other suitable mechanisms for suitably attaching the translucent identification member with or to a transaction card is also contemplated.

FIGS. 14 and 15 illustrate an alternative embodiment that basically reverses the role of the translucent identification member and the recipient unit. In this embodiment, the translucent identifier 14 contains the visual filtering or enhancement pattern 40 and the display screen displays at least one obscured identifier that may be for example data representing user authentication data that is unique to a user or non-unique to a user as desired (see FIG. 15). As with the previous embodiment, the combination of overlaying the translucent identification member (visual filter) over the display that displays an obscured identifier, reveals (unobscures) or enhances the at least one obscured identifier on the screen. The revealed user authentication data may then be entered into a suitable transaction device as the password or other user authentication information. Also, when the translucent area is attached or incorporated in a conventional transaction card, the transaction card includes as shown for example on FIGS. 12 and 13, a first portion containing a transaction card number and a second portion containing a translucent identification number or other identifying information having a translucent area that includes a visual filtering pattern.

FIG. 16 illustrates one example of a system 1600 employing the TIDM 14 of FIG. 14. In this example, the TIDM authenticator 24 includes an obscured identifier generator 1602 similar to the type used to generate the one or more identifiers described with reference to FIG. 1. The obscured identifier generator 1602 generates the obscured identifier(s) after receiving recipient specific information from a user, such as a user name, TIDM serial number, or other suitable information, to insure that the proper obscured identifier is displayed for that user. As part of the registration process, the user may have already provided the same user specific information and the obscured identifier generator 1602 may have already generated the obscured identifier and stored them in memory 22.

The translucent identification member issuer 12, in this example generates a TIDM 14 having a translucent area having a visual filtering pattern 40 thereon configured to visually filter a displayed obscured user identifier(s) 38 and is configured to overlay at least a portion of a display screen. Having a user enter in user specific information to initiate a session may be desirable where the same filtering pattern is printed on translucent identifier members for a plurality of users. It is desirable to know that the holder of the TIDM is a proper user as opposed to a thief that stole the TIDM. The authenticator, or other source, sends the generated obscured identifier to the recipient device. The recipient device displays the at least one visually obscured identifier as user authentication data and receives data representing the revealed user authentication data (such as the revealed ID itself or a representation of it) based on the translucent identification member having a filtering pattern thereon. For example when the translucent identification member having the filtering pattern thereon is held over the display, the filter reveals the user identifier. If desired, a translucent identifier serial number can be assigned to each TIDM even though the same filter pattern may be printed on more than one TIDM. As such, several users may have translucent identification members with the same filter pattern.

The translucent identification member issuer 12 is operative to generate a translucent identification member 14 having a translucent area that includes a visual filtering pattern 40 thereon configured to visually filter a displayed obscured user identifier and configured to overlay at least a portion of a display screen. The obscured identifier generator 1602 generates at least one visually obscured identifier for display on a display, in response to received user information such as user specific information. The translucent identification member authenticator 18, in this example receives data representing the revealed identifier such as through the user entering the information through a user interface after the filtering pattern is overlayed on the display and as previously described, the translucent identification member authenticator compares the received revealed identifier with a corresponding expected identifier (since it was generated by the obscured identifier generator) to determine whether proper authentication of a recipient is appropriate. Alternatively, the translucent identification member authenticator may send the received revealed identifier to a third party that carries out the comparison and sends a message back to the authenticator or recipient unit. Any other suitable division of operations may also be used as desired. The translucent identification member authenticator or third party then sends right-grant information to a recipient unit in response to the received data matching the corresponding expected identifier.

FIG. 17 illustrates one example of a method for securely providing identification information that includes generating at least one obscured identifier for a recipient based on, for example, received recipient secret data or non-secret data or data that is not related to or received from the recipient. This is shown in block 1700. As shown in block 1702, the method includes generating a translucent identification member 14 having a visual filtering pattern 40 thereon. After the TIDM has been made, the method includes receiving user identification information, such as a PIN: or other data as a first factor of authentication for the user. As shown in block 1704, the method includes sending the one or more obscured identifiers to the recipient and displaying at least one visually obscured identifier as second factor user authentication data, that when visually combined with the visual filtering pattern 40 on the translucent identification member, reveals an obscured identifier for a user. As shown in block 1706, the method includes, the user for example, overlaying the translucent identification member on the display to visually identify the obscured identifier through the filter. The method also includes receiving data representing the revealed user authentication data based on the translucent identification member having a filtering pattern thereon. The method also includes receiving user specific information, such as prior to the step of displaying the obscured identifier, to determine the visually obscured identifier to be displayed on the display. For example, the system needs to determine which obscured identifier to display since each user preferably has a different identifier. This may be determined for example by having the user enter user specific information, through a user interface in the recipient unit, such as a password or other secret or non-secret information as desired.

Stated another way, the method includes receiving user identification information as a first factor of authentication for a user and using, such as by the TIDM authenticator, service provider or other suitable entity, such user identification information to identify a translucent identification member in memory containing a particular visual filtering pattern known to have been associated with such user. The method includes generating an expected identifier to be used as a second factor of authentication for the user associated with the received user identification information and generating a pattern of obscured user identifiers containing the expected identifier such that when the pattern of obscured user identifiers is combined with the visual filtering pattern on the identified translucent identification member associated with the user the expected identifier will be revealed. The method includes transmitting the pattern of obscured user identifiers to a display (e.g., a displayed GUI) and requesting entry of a revealed identifier; and receiving data representing the revealed identifier. As noted above, the TIDM authenticator for example, or any suitable number of servers, or devices act as the circuits to carry out the above operations.

The primary functionality of the disclosed apparatus, methods and systems may be provided through application programming interfaces (APIs) that are executed by one or more processing devices that can be readily integrated into current infrastructures. In addition, each translucent identification member in one embodiment is different and has seemingly different random information since the seemingly random information is typically, but not necessarily, generated from information unique to a recipient, such as a password, user name, personal identification number, or any other information. In each embodiment, translucent identification members, and/or visual filters and/or obscured identifiers can be pre-manufactured and subsequently associated with a user. Additionally, the obscured identifiers and/or filtering patterns can be pre-generated and subsequently applied to translucent identification members. Such subsequent application to translucent identification members may be done by the creator of the filtering patterns or obscured identifiers or may be done by the entity providing the service or by a third-party contractor of the service provider. Since the manufacture of translucent identification members can be done with very simple materials such as transparent plastic, it is also possible for the service provider to send the obscured identifiers or visual patterns to users who can then themselves, apply the filtering pattern or obscured identifiers to a translucent identification member.

The same translucent identification member may be used a repeated number of times since there may be a plurality of different obscured identifiers thereon wherein each time authentication is requested a different one of the obscured identifiers is exposed through the visual filtering pattern. Hence the visually revealed identifier on the translucent identification member can change during each authentication session if desired. The translucent identification members described herein may be used for user authentication, activating software applications or for any other suitable purpose. The different obscured identifiers may be characters, images, or any other suitable information.

FIG. 18 illustrates one example of an article 1800 (e.g. a member), such as a translucent or non-translucent film, sticker, card, or any other suitable material or article. It will be recognized that the information shown on the article 1800 is shown as one example only and it will be recognized that any suitable information may be used. In this example, the article 1800 includes location information 1802 and 1804 (shown as row and column indicia) respectively and sender authentication information 1806 in the form of numbers that are addressable or locatable by the coordinate location information (e.g. row and column information). In addition, the article 1800 includes an optional article identifier 1808 such as a serial number generated (e.g. assigned) by the issuer of the article 1800.

Generally speaking, the article 1800 if desired, may be generated as described above with respect to the translucent identification member to generate for example the sender authentication information. However, in addition the location information 1802 and 1804 also needs to be added in one embodiment. In addition, it will be recognized that the translucent identification member 14 may also be used as a sender authentication article and that the obscured identifiers 38 may also serve as sender authentication information.

In addition, in this embodiment there need not be recipient specific information if the system does not require it, as the sender authentication information may be generated either independent from or based on recipient specific information if desired. This may occur when the recipient signs up for the service. In addition, as used herein, location information includes the information, for example, sent with a message or indexed by a message sent by the sender which indicates which sender authentication information on the article 1800 that the recipient is to verify. For example, location information need not be row and column information, but may merely be the terms such as "upper left corner", "lower left corner", "third from the right", or any other suitable information to notify the recipient which sender authentication information on the article is to be used as the authentication information for the given session, transaction or other communication. Alternatively, the sender authentication information can be a pointer to a location that contains the sender authentication information, such as, for example, a universal resource locator (URL) that points to the sender authentication information for the given session, transaction or other communication. Additionally, the location information can be a pointer to a location that contains the actual location information, which in turn indicates where to look on the article for the sender authentication information for the given session, transaction or other communication. In another embodiment, the location information is a visual filtering pattern.

FIG. 19 illustrates a transaction card 1900 that may include, for example, a magnetic strip 1902 or any other suitable information that may provide account information or message sender information. The transaction card 1900 may be for example a banking card, credit card, debit card or any other suitable transaction card as described above and may include transaction card identifier information such as a card number etc., as described above. This transaction card 1900 is different from conventional transaction cards because, among other things, it includes the article 1800 thereon (or member), therein or secured thereto in any suitable manner. As such, variations of the transaction card 1900 are illustrated for example in FIG. 13. In one example, the member 1800, such as a piece of adhesive backed paper or any other suitable member, is secured to a conventional transaction card if desired. It will also be recognized as described above that the member or article may be secured or suitably affixed in any suitable manner including, but not limited to adhesive, or any other suitable mechanism. The member 1800 may also be sent to a recipient as a tear away portion of a financial statement, billing statement etc. Preferably it is sized to fit on a transaction card.

FIG. 20 illustrates one example of a method for providing electronic message authentication that may be carried out by any suitable element. In this example, it may be carried out for example by a server or plurality of servers or other suitable applications executing on one or more processing devices. As shown in block 2000, the method includes, for example, when a sender such as a bank server or other message sender wishes to send a message to a recipient, determines desired location information, such as a row and column that also exists on the particular recipient's article, and corresponding desired sender authentication information to be sent and matched with sender authentication information located on the article and is locatable according to the sent location information. This may be done for example by accessing a database that links a recipient's email address for example, to corresponding database fields that represent for example the content of an article that was issued for that recipient. As shown in block 2002, the method includes sending the electronic message and both desired location information and corresponding desired sender authentication information, to the recipient wherein the desired sender authentication information is locatable on the article based on the sent desired location information. As such, for example, the sender or sending unit may associate (e.g., append, pre-pend, insert or otherwise attach) row and column information and corresponding sender authentication information that should appear at those locations on the article as part of an electronic message to a recipient. The recipient may then locate, based on the received column and row number, the sender authentication information on their article that was issued to them by (or on behalf of) the sender, and confirm that the sent desired sender authentication information matches the same information at the locations indicated by the sent location information sent by the sending unit. If a match occurs, then the recipient trusts the sender of the message. It will be recognized that the sent location information and sender authentication information may be the data itself, an index to, function of, reference to, or any other suitable representation of either of both the location information and the sender authentication information.

For example, the location coordinate information and corresponding sender authentication information could include electronically transmitted data for display on a display device, such as a visual filtering pattern and sender authentication information. In this embodiment, the article would be a transparent article to allow a user to place the article over an area of a display screen. The sent message would include the visual filtering pattern along with the desired sender authentication information that should appear visually to the user when the user overlays the article on a display screen. If the recipient visually recognizes or sees the sender authentication information that is revealed through the visual filtering pattern on screen with the sent desired sender authentication information and it matches, then the user can trust the sender of the message. As such, visual filtering techniques as previously described with respect to the translucent identification member for recipient authentication may be used in part to authenticate a sender.

Referring also to FIG. 21, a specific example of a message and associated sender authentication information and location information is shown as 2100. In a particular embodiment, also referring to FIG. 18, the message is appended with sender authentication information and in particular numbers "98413" and coordinate information of "A2, E4, F1, H4, J2". As such, the sending unit sends the electronic message along with both desired sender authentication information and desired location information as shown. The user then uses the article 1800 and looks, for example, at coordinate location A2 and sees the number 9, looks at the location coordinate E4 and sees the number 8, looks at the coordinate location F1 and sees the number 4, looks at the coordinate location H4 and sees the number 1, and looks at the coordinate location J2 and sees the number 3. If the user sees the same sender authentication information on the article 1800 as was sent by the sending unit, then the recipient trusts the sender as being an authentic message sender. In this example, the sender authentication information visually represents sender authentication information that is identifiable by location coordinate information in the form of rows and columns. However, it will be recognized that rows and column format need not be used and as such the cells as shown need not be employed. For example, if objects are used as opposed to letters and numbers, the objects may be located in upper left, upper right, middle or any other suitable location of the article and the sender authentication information, which could be the object can be sent such as in the form of a graphic or other suitable object, and the coordinate location information may actually be words that might read "upper left corner". Any other suitable coordinate location information or sender authentication information may also be used.

The article 1800 as noted above may be for example a piece of paper, a plastic card, transparent plastic card, sticker that can be affixed to existing plastic cards or any other suitable article. In this example, each email recipient is provided with the article with its own randomly (or seemingly randomly) generated contents. When sending an email, an originator's message transfer agent or other server component associates with each outbound email either directly or indirectly such as by a link to an HTML page using a URL or other suitable reference, coordinates or other directions for locating one or more of the card's cells or locations. Also appended, pre-pended, inserted, or otherwise attached to the email are the contents at those locations. Upon receipt, the user confirms the lookup results using their individual sender authentication article, such as reading the coordinates listed in the email and looking them up on their own sender authentication article. In the embodiment where a translucent version of the authentication article is used, the authentication article may be placed over a visual filtering pattern provided with the email and the revealed sender authentication information is compared by the recipient to the desired sender authentication information that is provided in the email. If the characters or other information do not match, then the authentication has failed.

FIG. 23 illustrates in more detail a method for providing electronic message authentication wherein the method includes, as shown in block 2300, generating for example, random sender authentication information to be placed on the article and if desired, location information that may also be placed on the article and linking the two with the selected recipient. Random includes pseudo random information or any suitable level of randomization of information. This may be done as described above with respect to the translucent identification member through a suitable interface on one or more server computers or any other suitable device. As shown in block 2302, this information is stored as the authentication information and corresponding location information in a suitable database. As shown in block 2304, the method includes creating an article, such as article 1800 containing the location coordinate information and corresponding sender authentication information and if desired an article identifier 1808 such as serial number for issuance to a specific recipient. This may be done, for example, in basically a similar manner as described above. For example, a card may be printed, a transaction card may be suitably formed, or a sticker may be generated that can be adhered to any suitable article. The article is then sent to the recipient by mail or any other suitable channel.

In an alternative embodiment, instead of using a type of hard token (e.g. article), a soft token may be used wherein the representation (may not be an actual image) of a card for example or representation of an article may be sent electronically for display via a display screen to a user or for other electronic access by such user, either during each session or once and the user may store the electronic sender authentication article in a file and may access it as necessary. As such the electronic representation of the article can be accessed by a software application so as to provide the recipient with the sender authentication information located at the location identified by the sent location information.

As shown in block 2306, the method also includes, for example as described above with respect to FIG. 20, determining, such as by the sender, at least one desired item of location information and corresponding sender authentication information to append, pre-pend, insert, or otherwise attach to the current message. Selection of the location information and authentication information may be done in any suitable manner, such as randomly or in any other suitable fashion as desired. As shown in dashed block 2308, in an alternative embodiment, location information and sender authentication information is effectively communicated in the form of a visual filtering pattern that may, if desired, cover up all row and column headings and instead just allow the sender authentication information to be visually displayed when the article is overlaid. As such, the method may include sending a visual filtering pattern for display to the recipient to allow the recipient to visually determine whether the sender is authentic. The recipient may place at least a portion of the sender authentication information that is on the article, over a visual filtering pattern that is displayed on the display screen, to determine whether the sent sender authentication information with the message matches the sender authentication information made visible by the visual filtering pattern.

In one example the method includes appending at least one desired item of location information and corresponding sender authentication information to an electronic message for a recipient. The sender authentication information visually represents authentication information identifiable by the location coordinate information. As such, the message itself may be appended, pre-pended, inserted, or otherwise attached to the information or may contain a reference to the information such as a website or any other suitable link or any other suitable representation of the sender authentication information and location coordinate information.

As shown in block 2310, the method includes sending the electronic message and data representing both the location coordinate information and the corresponding sender authentication information to a recipient. The recipient may then look at the information on the article and see if it matches that which was sent by the sending unit.

It will also be recognized that determining at least one location coordinate, based on the location information and corresponding sender authentication information may be done, for example, dynamically as opposed to looking up the information stored in the database. For example, the sender (e.g. message sending unit) may simply be programmed with a function to generate sender authentication information to send as opposed to looking up pre-stored information.

Also if desired, the sender authentication information may be information for example, such as the ending balance on a bank statement, any suitable information in a billing statement or account statement that the sender may have previously sent to the recipient that may contain the sender authentication information. The location information may be the date of a particular statement and the sender authentication information may be the current balance on a credit card account. Any other statement may also be used or any other information known to, or provided by, the sending unit that is in the possession of the recipient may be used.

FIG. 22 illustrates one example of a system for providing electronic message authentication that may, if desired, carry out the steps described with reference to FIG. 23. For example, a sending unit 2200, such as any server computer, plurality of servers, mobile devices or any other suitable structure may include a sender authentication article issuer 2202, or a third party may issue the sender authentication article as desired. For example, the sender authentication article issuer 2202 may generate the random sender authentication information and corresponding location coordinate information and link it with a recipient and store the information in the database 2204. The article 1800 may then be mailed, for example, to a recipient, or in the case of a soft token, sent electronically to the recipient. In this illustration (FIG. 22), a translucent article is shown. As such, the recipient 20 includes a display 30 and the message 2100 for example is displayed on the display along with a visual filtering pattern and the sent sender authentication information. The visual filtering pattern is then used to reveal the expected sender authentication information that is then matched by the recipient to that sent in the message 2100. In this embodiment where the sender authentication article is a translucent type, the visual filtering pattern sent by the sender unit embodies location information since the result of the recipient overlaying the sender authentication article on a display screen will result in a visually revealed sender authentication information at particular locations in the article. As such, the visual filtering pattern includes the location information. In addition, it will be recognized that the term information refers to any suitable indicia.

The sending unit 2200 which may be a suitable server in a network, node, or any other suitable device, includes one or more circuits which may be in the form of one or more processing devices that execute software instructions that are stored in memory, or may be implemented using discrete logic, or any suitable combination of hardware, software or firmware to carry out the operations described herein. As such, the sender unit 2200 includes circuits that are operative to carry out the steps as described above.

In another embodiment, the use of the sender authentication article may be combined for example with the systems described above with respect to the translucent identification member such that the translucent identification member includes the location information and sender authentication information thereon. For example the obscured identifiers if desired may also serve as the sender authentication information or in an alternative embodiment the translucent identification member may have a portion that includes the obscured identifiers and another portion that includes the location information and sender authentication information. In any event, use of a single article or member which is translucent as described herein can provide multi-level authentication. For example, for sender authentication, the methods described above with respect to FIGS. 18-22 may be employed to confirm that the sender is authentic. Once a recipient for example is convinced that the sender of an email is authentic, the recipient may then click on a URL sent in the email message and then be presented with a suitable HTML form to enter account information or other confidential information. However, prior to entering this confidential information a second level of authentication may be carried out employing the translucent identification member and obscured identifiers so that the sending unit can authenticate the recipient at this stage of the session or transaction. It will also be recognized that any other suitable ordering of operations or combinations of the authentication schemes may also be employed.

In addition use of the claim terms includes any representation thereof. For example the term sender authentication information includes the data itself, any index to the data, any reference or pointer to the data, or any other representation thereof.

Among other advantages, there need not be any modification to a message transfer agent or email client of a recipient. Also if desired, no recipient computers need to be registered allowing authentication to be performed from any computer if desired. The system may also be applicable to mobile devices where lookup coordinates can be easily displayed on a small display screen. Other authentication purposes may include web authentication, interactive voice response authentication or any authentication scenario. In addition, the system and methods offer a type of inexpensive mechanism such as the authentication cards that can be distributed versus more complex technologies that may require smart cards, tokens or public key infrastructures. Other advantages will be recognized by those of ordinary skill in the art.

The above detailed description of the invention and the examples described therein have been presented for the purposes of illustration and description and that other variations will be recognized by those in the art. For example, it will be recognized that the various operations described herein may be distributed in a network or non-network configuration. For example, different operations of the authenticator or TIDM issuers or other operations may be performed by one or more third party web server(s) or other entities or devices. Other variation will also be recognized for the sender authentication apparatus and methods.

It is therefore contemplated that the present invention cover any and all modifications, variations or equivalents that fall within the spirit and scope of the basic underlying principles disclosed above and claimed herein.

What is claimed is:

1. A transaction card comprising:
    transaction card serial number information thereon that identifies the transaction card;
    sender authentication information thereon identifiable by location information;
    the location information arranged on the transaction card with respect to the sender authentication information; and
    account information on the transaction card.

2. The transaction card of claim 1 wherein the sender authentication information and location information is on a member that is secured to the transaction card.

3. A transaction card comprising:
    transaction card serial number information thereon that identifies the transaction card;
    a translucent identification member affixed to the transaction card comprising:
        sender authentication information identifiable by location information; and
        location information arranged on the transaction card with respect to the sender authentication information.

4. The transaction card of claim 1 wherein the location information and sender authentication information are arranged as row and column data on the transaction card.

5. The transaction card of claim 3 wherein the translucent identification member is foldable along a fold line.

* * * * *